United States Patent
Subramaniam et al.

(10) Patent No.: US 12,417,427 B2
(45) Date of Patent: *Sep. 16, 2025

(54) ENFORCING DATA CONSISTENCY IN A TRANSPORTATION NETWORK

(71) Applicant: UNITED PARCEL SERVICE OF AMERICA, INC., Atlanta, GA (US)

(72) Inventors: Balakrishna Subramaniam, Prospect, KY (US); Jason Chodyniecki, Louisville, KY (US)

(73) Assignee: UNITED PARCEL SERVICE OF AMERICA, INC., San Jose, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 18/457,691

(22) Filed: Aug. 29, 2023

(65) Prior Publication Data

US 2023/0401524 A1    Dec. 14, 2023

Related U.S. Application Data

(63) Continuation of application No. 17/534,734, filed on Nov. 24, 2021, now Pat. No. 11,783,278, which is a
(Continued)

(51) Int. Cl.
*G06Q 10/08* (2024.01)
*G06F 16/22* (2019.01)
(Continued)

(52) U.S. Cl.
CPC ..... *G06Q 10/0833* (2013.01); *G06F 16/2291* (2019.01); *H04L 9/50* (2022.05)

(58) Field of Classification Search
CPC .... G06Q 10/0833; G06F 16/2291; H04L 9/50
(Continued)

(56) References Cited

U.S. PATENT DOCUMENTS 11,188,869 B2 * 11/2021 Subramaniam ..... G06F 16/2291
11,783,278 B2 * 10/2023 Subramaniam .... G06Q 10/0833
705/333

(Continued)

FOREIGN PATENT DOCUMENTS

| CN | 106096876 A | 11/2016 |
| CN | 107122938 A | 9/2017 |

(Continued)

*Primary Examiner* — Daniel A Hess
(74) *Attorney, Agent, or Firm* — Shook, Hardy & Bacon L.L.P.

(57) ABSTRACT

Systems and methods are described for enforcing consistency of data between disparate systems of a transportation network with verified transactions. Embodiments include receiving a transaction that is generated based on a command indicating an intent to transfer an asset from the originating hub to a destination hub. The generated transaction can include a sender identifier associated with the originating hub, an asset identifier associated with the asset, and a detected location of the asset. The received transaction is communicated to any node of the plurality of nodes that are configured store it onto a distributed ledger based on a determined verification that the included detected location corresponds to a location associated with the included sender identifier.

20 Claims, 12 Drawing Sheets

Related U.S. Application Data continuation of application No. 16/242,717, filed on Jan. 8, 2019, now Pat. No. 11,188,869.

(51) Int. Cl.
*G06Q 10/0833* (2023.01)
*H04L 9/00* (2022.01)

(58) Field of Classification Search
USPC .......................................................... 705/333
See application file for complete search history.

(56) References Cited

U.S. PATENT DOCUMENTS

| | | | |
|---|---|---|---|
| 2018/0096175 | A1 | 4/2018 | Schmeling et al. |
| 2018/0220278 | A1 | 8/2018 | Tal et al. |
| 2018/0232693 | A1* | 8/2018 | Gillen ................ G06Q 10/0834 |
| 2018/0349845 | A1 | 12/2018 | Klein |
| 2019/0012637 | A1 | 1/2019 | Gillen |
| 2020/0034876 | A1 | 1/2020 | Soundararajan et al. |
| 2020/0219053 | A1 | 7/2020 | Subramaniam et al. |
| 2020/0294128 | A1 | 9/2020 | Cella |
| 2020/0328890 | A1 | 10/2020 | Connor |
| 2021/0192446 | A1 | 6/2021 | Bitauld et al. |
| 2022/0083967 | A1 | 3/2022 | Subramaniam et al. |

FOREIGN PATENT DOCUMENTS

| | | |
|---|---|---|
| CN | 107679794 A | 2/2018 |
| CN | 108681862 A | 10/2018 |
| CN | 109034707 A | 12/2018 |
| CN | 109102048 A | 12/2018 |
| CN | 109685942 A | 4/2019 |

\* cited by examiner

ENFORCING DATA CONSISTENCY IN A TRANSPORTATION NETWORK

CROSS-REFERENCE TO RELATED APPLICATIONS

This application is a continuation of U.S. patent application Ser. No. 17/534,734 filed Nov. 24, 2021 and entitled "Enforcing Data Consistency in a Transportation Network," which is a continuation U.S. Pat. No. 11,188,869 (U.S. patent application Ser. No. 16/242,717), filed Jan. 8, 2019, issuing on Nov. 30, 2021, and entitled "Enforcing Data Consistency in a Transportation Network," which are all hereby incorporated in their entireties by reference herein.

BACKGROUND

Assets such as vehicles or cargo are often transferred between transportation hubs of a transportation network. For example, a transportation hub may transfer a tractor trailer carrying cargo to another transportation hub. Transportation networks are often complex and difficult to manage using conventional technology. This is especially true when the network is made up of transportation hubs that operate on independent electronic platforms. To manage operations, each transportation hub can employ a local electronic routing system. However, there are certain limitations to these existing electronic routing systems. Initially, it is difficult for one routing system to notify another routing system of an asset transfer because asset transfers between transportation hubs can be lost through various communication channels or be left unreported altogether. This introduces irreconcilable data into the transportation network. Complicating matters, many of these electronic routing platforms have been tailored to the specific needs of the transportation hub. Incompatible routing platforms can lead to technical challenges in creating a unified platform that is capable of coordinating operations performed at one transportation hub with the operations performed by another transportation hub.

BRIEF DESCRIPTION OF THE DRAWINGS

Illustrative embodiments of the present invention are described in detail below with reference to the attached drawing figures, and wherein.

SUMMARY

Figure 1:
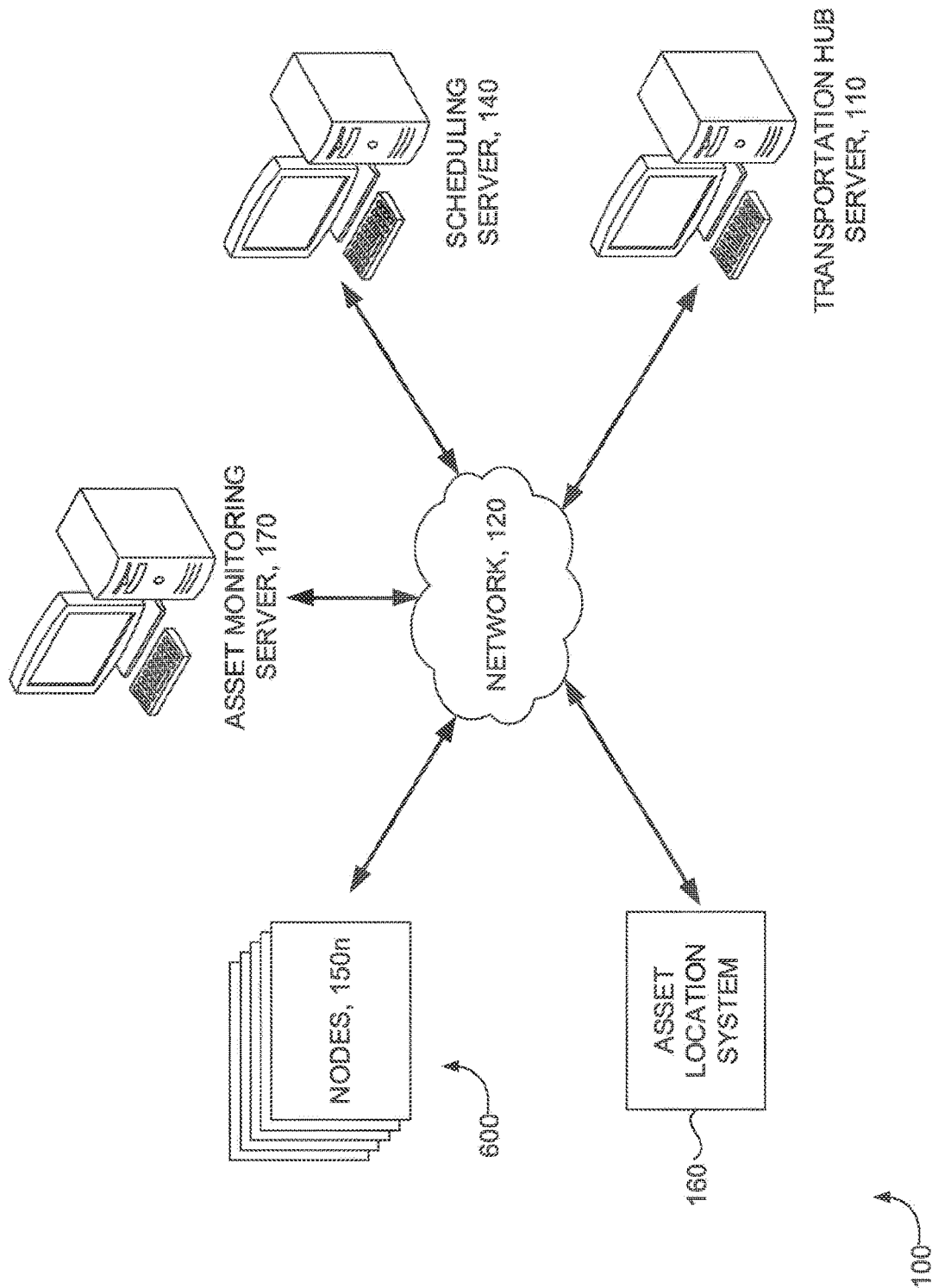
FIG. 1 is an exemplary operating environment in accordance with some embodiments of the present disclosure.

A high-level overview of various aspects of the technology described herein is provided as an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter.

Various embodiments are directed to a method for maintaining consistency of data between disparate systems of a transportation network with verified transactions. The method comprises receiving, by a first node of a plurality of nodes and associated with an originating hub, a first transaction that is generated based on a received first command indicating an intent to transfer an asset from the originating hub to a destination hub. The generated first transaction can include a sender identifier associated with the originating hub, an asset identifier associated with the asset, and a detected location of the asset. The method further comprises communicating, by the first node, the received first transaction to any node of the plurality of nodes, wherein the plurality of nodes is configured to obtain the communicated first transaction and store it onto a distributed ledger based on a determined verification that the included detected location corresponds to a location associated with the included sender identifier. Additionally, the method comprises receiving, by the first node, a second transaction that references the first transaction and is generated by a second node of the plurality of nodes, wherein the second node is associated with the destination hub, and is configured to generate the second transaction based on a determination that the communicated first transaction was stored onto the distributed ledger. Additionally, the method comprises storing, by the first node, the received second transaction onto the distributed ledger.

A further embodiment is directed to a system for enforcing consistency of data between disparate systems of a transportation network with verified transactions. The system comprises a first node of a plurality of nodes and associated with an originating hub. The first node configured to receive a first transaction that is generated based on a received first command indicating an intent to transfer an asset from the originating hub to a destination hub, the generated first transaction including a sender identifier associated with the originating hub, an asset identifier associated with the asset, and a location received from a sensor module associated with the asset. The first node further configured to communicate the received first transaction to any node of the plurality of nodes, wherein the plurality of nodes is configured to obtain the communicated first transaction and store it onto a distributed ledger based on a determined verification that the included detected location corresponds to a location associated with the included sender identifier. The first node is also configured to receive a second transaction that references the first transaction and is generated by a second node of the plurality of nodes, wherein the second node is associated with the destination hub, and is configured to generate the second transaction based on a determination that the communicated first transaction was stored onto the distributed ledger. Additionally, the first node configured to store the received second transaction onto the distributed ledger.

In various embodiments, an aspect is directed to a non-transitory computer storage medium storing computer-useable instructions that, when used by at least one computing device, cause the at least one computing device to perform operations comprising obtain, by a first node of a plurality of nodes and associated with a destination hub, a first transaction generated by a second node of the plurality of nodes. The second node is configured to generate the first transaction based on a received first command indicating an intent to transfer an asset from an originating hub to the destination hub. The generated first transaction includes a sender identifier associated with the originating hub, an asset identifier associated with the asset, and a detected location of the asset. The operations further comprising determine, by the first node, a verification that the included detected location corresponds to a location associated with the included sender identifier, wherein the plurality of nodes is configured to collectively determine the verification. Additionally, the operations comprise communicate, by the first node, the obtained first transaction to a second node for verification and storage onto the distributed ledger.

DETAILED DESCRIPTION

The subject matter of the technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of the methods employed, the terms should not be interpreted as implying any particular order among or between various steps herein disclosed unless and except when the order of individual steps is explicitly described. Additionally, although the singular or plural form of terms may be used herein, the use of the singular/plural should not be interpreted as excluding the plural/singular unless and except explicitly stated.

Generally, a transportation network can include numerous transportation hubs where assets (e.g., cargo, trailers, or vehicles) are transferred from one hub to another. Each transportation hub can employ an independent routing platform to manage the feeder operations. These independent routing systems allow for greater flexibility in managing feeder operations. Additionally, in the event of a black out or system outage where the routing system crashes or is corrupted, the use of independent routing platforms ensures that the overall network can still operate. In other words, if the routing platform at one transportation hub fails, the other transportation hubs can continue to operate.

However, independent routing platforms present numerous technological problems for managing a transportation network. Independent routing platforms can limit the ability for a single system to maintain accurate records of all the asset transfers across every transportation hub. In addition, independent routing platforms may introduce inaccurate asset transfer data. Even worse, asset transfer data may be left unreported, leaving gaps in asset transfer data.

Even more, these independent routing platforms are often incompatible with one another. For instance, each routing platform may depend on unique information technology (IT) systems that are specific to that transportation hub. As one skilled in the art would appreciate, information technology addresses how computers are programmed to structure, retrieve, communicate, and analyze data. Independent routing platforms can therefore lead to fragmented, disparate routing platforms that make it difficult to reconcile operations across all transportation hubs.

Many solutions addressing these technological problems may be impractical or too costly. For example, many of the routing platforms may be outdated. However, they still are fully capable of maintaining feeder operations. Repurposing or replacing existing routing platforms and their technological infrastructure (e.g., software coding, database architecture, operating systems, computer hardware, etc.) is impractical since they are still operational.

Additionally, repurposing or replacing existing routing platforms is quite costly. Assuming the existing routing platform can be repurposed, updating these platforms would require a specific skill set or expertise that is scarcely available (if at all). This lack of expertise significantly increases the cost associated with repurposing existing technological infrastructure. To make matters worse, some existing technological infrastructures cannot be updated. This would require an outright replacement of the technological infrastructure. The costs associated with replacing or repurposing existing technological infrastructure would be compounded as each transportation hub system throughout the transportation network might have to be updated.

Provided the foregoing, technologies described herein allow for managing and validating asset transfers across independent transportation hub platforms. In some embodiments, transportation hub servers associated with a transportation hub may coordinate with one or more other systems to ensure that asset transfers are verified and reported. Generally, an asset transfer can relate to transporting an asset, such as a vehicle, cargo, or storage containers, between transportation hubs.

For example, around the time of dispatching an asset, an originating hub (also referred to as a dispatching hub) can communicate an intent to transfer to one or more systems for confirmation. Among other things, the intent to transfer can include information or parameters relevant to the asset transfer that may be used to confirm or verify the transfer of intent. Exemplary parameters include asset characteristics, such as asset size, load, or vehicle resources associated with the asset transfer. Other parameters include an asset identifier, asset location, originating hub location, destination hub authorization, indication that the asset transfer is scheduled, and the like. In some aspects, the location of the asset may be obtained from one or more sensors (e.g., GPS signal, a camera, wireless signal, and the like) and communicated to one or more systems. The one or more systems can then determine whether the asset's location corresponds to the location of the originating hub. Based on corresponding locations, the node may validate the transfer of the asset from the originating hub to a destination hub (also referred to herein as a receiving hub).

The systems can confirm other information associated with the asset transfer. For example, the intent to transfer may be confirmed based on the asset transfer being a scheduled asset transfer. As a further example, the intent to transfer can be confirmed based on an authorization by a destination transportation hub. In yet another example, the intent to transfer can be confirmed based on monitoring the asset state (e.g., whether it has been loaded, departed the originating hub, en route, or received by the destination hub). If the intent to transfer is confirmed or verified, then the asset can be dispatched to the destination hub. In some embodiments, the intent to transfer is confirmed or verified through a confirmed intent transaction that is stored on a distributed ledger network 600.

In various aspects, the intent to transfer can be associated with a smart contract that can be committed to or maintained on a distributed ledger. The smart contract may rely on one or more systems' confirmation before being executed by a node 150n maintaining the distributed ledger. In some embodiments, the smart contract may rely on the digital signature from a transportation hub location server, a scheduling server, an asset location system, or an asset monitoring server before the node can verify the smart contract. In some aspects, verification of the smart contract may trigger the generation of a transaction that is committed to a distributed ledger that confirms the asset transfer. Among other advantages, the digital signatures allow the node 150n to verify the public key of the server digitally signing the transaction. As described below, each server may be associated with unique cryptographic keys which the node may reference in order to verify the authenticity of the digital signature. In addition, utilizing one or more system's digital signature can ensure that only accurate asset transfer data is introduced into the network as each system may confirm that the details associated with asset transfer are correct. Based on one or more system's digital signatures, the node 150n can verify the smart contract, which can lead to generating a transaction of confirmed intent for storage on a distributed ledger. As noted above, the confirmed intent transaction can include information related to the asset transfer so that each system can determine verified asset transfer information.

An asset transfer that has been confirmed and committed to the distributed ledger can therefore be used as a single source of truth for asset transfer across the transportation network while still allowing each transportation hub to maintain independent or incompatible rerouting platforms. As such, utilizing the technology described herein may improve the verification of asset transfer data by preventing incomplete or fragmented data from being introduced into the transportation network. An additional advantage is that in the event of a system outage at a transportation hub, the transportation hub may seamlessly re-build its records of asset transfers and minimize the time in recovering data lost during the system outage. These and other improvements to technology will be apparent to those skilled in the art.

Turning now to FIG. 1, a schematic depiction is provided illustrating an exemplary distributed operating environment 100 of which some embodiments of the present disclosure can be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, software, or a combination thereof. For instance, various functions may be carried out by a processor executing instructions stored in memory.

The operating environment 100 of FIG. 1 includes a transportation hub server 110 that is in communication with a network 120, such as the Internet. The operating environment 100 may also include a scheduling server 140, a transportation hub server 110, an asset location system 160, an asset monitoring server 170, or a distributed ledger maintained by a plurality of nodes (such as node 150n) that are also in communication with the network 120. It should be appreciated that while depicted in a distributed environment, the systems (e.g., scheduling server 140, transportation hub server 110, asset location system 160, the asset monitoring server 170, and nodes 150n) may operate in a non-distributed environment. Additionally, it should be appreciated that each of the computing devices and systems may be associated with a node (e.g., one of nodes 150n) that maintains a distributed ledger. In other words, the transportation server 110 can operate as a node 150n, the scheduling server 140 can operate as a node 150n, the asset location system 160 can operate as a node 150n, and the asset monitoring server 170 can operate as a node 150n. While referred to as a server or a system, the scheduling server 140, transportation hub server 110, asset location system 160, the asset monitoring server 170 can also be referred to as a node.

The operating environment 100 can be used to validate asset transfers across a transportation network. The transportation network may comprise a plurality of transportation hubs that can receive and dispatch assets. As used herein, the term "asset" refers to a physical object that can be transferred from one transportation hub to another. Generally, the asset can be capable of storing physical items or loads. For instance, an asset may refer to a vehicle that is transferred from one transportation hub to another. Alternatively, an asset may refer to a storage container transported by the vehicle from one transportation hub to another. Asset transfers can allow for physical transfer of loads throughout a transportation network. For example, an asset loaded with goods or passengers can be transferred from the dispatching transportation hub and transported to a receiving transportation hub. Among other things, the transportation of the asset may be by land, air, or sea.

Each asset can be associated with an asset identifier. As used herein an "asset identifier" refers to any description or identification that identifies a particular asset. The asset identifier may be used by one or more systems (e.g., the transportation hub server 110, the scheduling server 140, one or more nodes 150n, the asset location system 160, or the asset monitoring server 170) to determine the physical asset associated with the asset transfer. In some aspects, the asset identifier may include a unique alphanumeric code.

One or more parameters, often referred to herein as asset transfer parameters, can be used to confirm an asset transfer. The asset transfer parameters can capture details about a particular asset transfer. In various embodiments, asset transfer parameters may comprise one of an asset identifier, a particular location associated with the asset, an indication that an asset transfer has been scheduled, an originating transportation hub (e.g., where the asset has or will be departing from), a destination transportation hub (e.g., where the asset has or will be arriving at), a state of the asset (e.g., loaded, departed, or received), or any combination thereof. Additionally, the asset transfer parameters may comprise a vehicle identifier (which may be a vehicle that is transporting the asset associated with the asset identifier) and a vehicle operator identifier.

As described herein, an intent to transfer may be generated by one or more systems of a transportation network. The term "intent to transfer" generally refers to an indication that an asset is or will be physically transferred between transportation hubs. For example, in some embodiments, an intent to transfer may be associated with a request to dispatch an asset. While not limited to the systems depicted in FIG. 1, a record of the intent to transfer can be generated by the transportation hub server 110, the scheduling server 140, the asset location system 160, the asset monitoring server 170, or the nodes 150n. In some embodiments, the intent to transfer record can be generated by the transportation hub server 110 associated with an originating transportation hub. Among other things, the intent to transfer record may be generated based on a determination to dispatch the asset. In some aspects, the determination to dispatch the asset can be determined automatically. For example, the intent to dispatch can be based on detecting the asset's departure from a transportation hub location. In some aspects, the determination to dispatch can be in response to receiving input from a user through a user computing device (such as device 1100 as described with reference to FIG. 11).

In some aspects, the intent to transfer can be stored as a record (e.g., an intent to transfer record) with one or more asset parameters. The intent to transfer record then can be communicated to other systems over a communications network, such as the network 120. Additionally, as described in more detail below, the intent to transfer record can be committed to a distributed ledger, such as an intent to transfer transaction 610. One or more systems can then parse the distributed ledger in order to analyze or confirm the intent to transfer.

Figure 11:
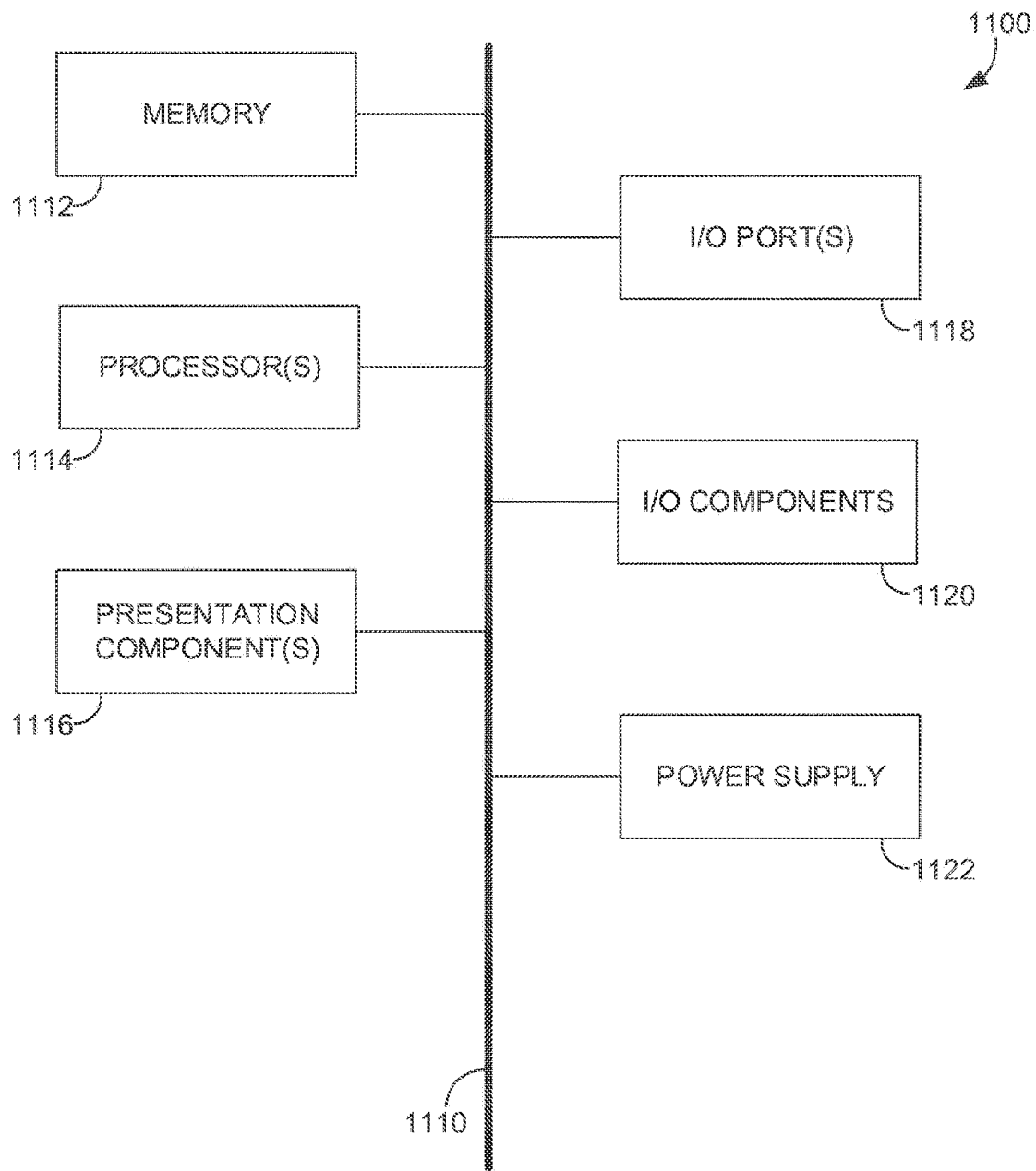
FIG. 11 is a block diagram depicting an exemplary computing environment suitable for use in implementing some embodiments of the present invention.

Referring still to FIG. 1, the transportation hub server 110 may be any computing device, such as the computing device 1100 of FIG. 11. In general, the transportation hub server 110 can be associated with a transportation hub involved in the asset transfer. In some aspects, while not illustrated, a first transportation hub server can be associated with a dispatching transportation hub, while a second transportation hub server can be associated with a destination transportation hub. In other words, a first transportation hub server can be associated with a transportation hub that dispatches an asset, while a second transportation hub server can be associated with a transportation hub receiving the asset.

In various embodiments, the intent to transfer can be associated with one or more parameters (referred to herein an asset transfer parameter) specific to each asset transfer. The asset transfer parameters generally inform other systems within the transportation network of relevant information associated with the asset transfer. As described herein, the other systems can rely on the asset transfer parameters to confirm or validate the asset transfer. In some aspects, the asset transfer parameters comprise one of an asset identifier, an projected date or time of the transfer (e.g., arrival or departure), a particular location associated with the asset or asset identifier, an originating transportation hub (e.g., where the asset has or will be departing from), a destination transportation hub, a vehicle identifier (e.g., a ship, truck, airplane, or the like), a vehicle operator identifier, an indication that the asset transfer has been scheduled, an indication of the state of the asset, or any combination thereof.

In some embodiments, each system may individually confirm a specific parameter associated with the intent to transfer. In various aspects, the scheduling server 140 may determine if the asset transfer is a planned or scheduled asset transfer before validating the intent to transfer. For example, the scheduling server 140 may receive the intent to transfer and extract the asset identifier, the dispatching transportation hub, and a receiving transportation hub. The node may then compare this to a scheduled asset identifier, a scheduled dispatching transportation hub, and a scheduled receiving transportation hub. If the scheduling server 140 determines that the intent to transfer corresponds to a scheduled asset transfer, the scheduling server 140 may confirm the intent to transfer. Other parameters can include a particular operator assigned to the asset transfer, the anticipated date of the asset transfer, and the asset identifier associated with the asset that is scheduled to be transferred. Requiring each system to validate the intent to transfer based on particular rules and parameters, embodiments described herein can overcome some of the deficiencies in conventional technology.

The intent to transfer record can be communicated to one or more systems across the transportation network. Communicating the intent to transfer record generally allows the one or more system to analyze and confirm the intent to transfer. For example, the intent to transfer record can be communicated from the transportation hub server 110 over the network 120 to another transportation hub server (not shown), the scheduling server 140, the asset location system 160, the asset monitoring server 170, or the one or more nodes 150n. The one or more systems can then receive the intent to transfer record, analyze it, and respond accordingly as described in more detail herein.

In various embodiments, the one or more nodes 150n can commit a communicated intent to transfer record for storage on one or more distributed ledgers. For instance, the one or more nodes 150n can generate a transaction for the intent to transfer record, such as an intent to transfer transaction 610, as described in more detail below with reference to FIGS. 6A-B through FIG. 7. One or more of the systems can query the distributed ledger to identify an intent to transfer record based on one or more search parameters (e.g., asset identifier, hub location identifier, wallet address, IP address, and the like). Once an intent to transfer is identified, the one or more systems can respond accordingly (e.g., confirm, deny, submit a digital signature, submit additional information, and the like).

As described herein, the intent to transfer record can require a determination by the transportation hub server 110. The transportation hub server 110 can analyze the one or more of the intent to transfer parameters and respond accordingly (e.g., confirm/deny the intent to transfer, or digitally sign a smart contract). Among other things, the transportation hub server 110 can analyze the intent to transfer record and determine if the asset transfer involves a transportation hub associated the transportation hub server 110. For instance, an intent to transfer record can identify a particular transportation hub as the destination transportation hub (e.g., through a receiver identifier). The receiver identifier may be any identifier, such as a physical address, digital address, alphanumeric code, or coordinates that identifies a particular transportation hub as a hub that is receiving the asset. In some embodiments, the receiver identifier is a digital address such as a wallet address, an IP address associated with a server managing the destination transportation hub, and the like. Based on determining that a destination transportation hub is involved in the asset transfer, the particular transportation hub server associated with the destination transportation hub can respond accordingly. It should be appreciated that the location of the destination transportation hub can identified based on the receiver identifier. As described below, in some embodiments, the one or more system of operating environment 100 may rely on the physical location of a particular transportation hub to confirm the intent to transfer. For instance, the asset location may be compared to the physical location of a location of the destination transportation hub in order to confirm the intent to transfer. Similarly, an intent to transfer record can identify a particular transportation hub as the dispatching transportation hub (e.g., through a sender identifier). The sender identifier may be any identifier, such as a physical address, digital address, alphanumeric code, or coordinates that identifies a particular transportation hub as a hub that is dispatching the asset. In some embodiments, the sender identifier is a digital address such as a wallet address, an IP address associated with a server managing the destination transportation hub, and the like. Based on determining that a dispatching transportation hub is involved in the asset transfer, the particular transportation hub server associated with the dispatching transportation hub can respond accordingly. It should be appreciated that the location of the destination transportation hub can identified based on the receiver identifier. As described below, in some embodiments, the one or more system of operating environment 100 may rely on the physical location of a transportation hub to confirm the intent to transfer. For instance, the asset location may be compared to the physical location of a location of the dispatching transportation hub in order to confirm the intent to transfer.

In various embodiments, the transportation hub server 110 can respond by communicating its determination (e.g., confirmation or denial) to the other systems via the network 120. In some embodiments, the transportation hub server's 110 confirmation or denial is utilized in confirming the intent to transfer. In some aspects, as described in more detail below, the transportation hub server 110 can communicate its determination to the one or more nodes 150*n* for storage on the distributed ledger network 600. In some aspects, the transportation hub server 110 can generate a transaction capturing the server's determination (e.g., confirmation or denial) of the intent to transfer, which can then be stored on the distributed ledger via a node 150*n*. For example, the transportation hub server's 100 confirmation (or denial) can be captured within the confirmation of asset transfer transaction 620. The generated transaction can then reference the intent to transfer transaction. In various aspects, if the intent to transfer is associated with a smart contract, the transportation hub server 110 can digitally sign the smart contract using one or more cryptographic key pairs.

In some embodiments, the intent to transfer can require a determination from the scheduling server 140. For instance, the scheduling server 140 can determine whether the asset transfer identified by the intent to transfer has been scheduled. Generally, the scheduling server 140 can forecast resources for each asset transfer or maintain a schedule of expected asset transfers across the entire transportation network. Forecasting resources or maintaining a schedule of expected asset transfers across the network allows the transportation network to work efficiently. In addition, the forecasts and schedules can ensure inaccurate asset transfer data is not introduced into the operating environment 100. As discussed in more detail below, the scheduling server can forecast asset transfers or assign resources, such as operators or vehicles, to transport the asset. For instance, the scheduling server can receive an intent to transfer record from the one or more systems of the operating environment 100. As described herein, the intent to transfer record may be generated by the transportation hub server 110. In some aspects, the intent to transfer record can be identified based on a communication of the intent the transfer record to the scheduling server 140. Additionally, in various aspects, the scheduling server 140 may identify intent to transfer record by monitoring the distributed ledger. For example, the scheduling server 140 may query the distributed ledger for any new intent to transfer records. As a further example, the scheduling server 140 may query the distributed ledger for a transaction referencing a scheduling server identifier (e.g., alphanumeric code, a wallet address, an IP address of the scheduling server, and the like). The scheduling server 140 can then analyze an intent to transfer record committed to the distributed ledger (e.g., the intent to transfer transaction 610 of FIG. 6B) to determine if it corresponds to a forecasted asset transfer.

In some embodiments, the scheduling server 140 can utilize one or more asset transfer parameters in to confirm the intent to transfer. In other words, the scheduling server 140 can determine whether the asset transfer is a forecasted asset transfer (also referred to as a scheduled asset transfer) based on one or more asset parameters associated with the intent to transfer. By way of example, the scheduling server 140 can determine whether the asset transfer parameter associated with the intent to transfer corresponds to a parameter associated with the forecasted asset transfer. The scheduling server 140 can determine if the asset transfer parameter corresponds to, among other things, at least one of a forecasted asset identifier, a forecasted location of the asset, a forecasted originating transportation hub, a forecasted destination transportation hub, a forecasted vehicle operator, or a forecasted vehicle identifier. In an exemplary aspect, the scheduling server 140 can determine that the intent to transfer is associated with an asset location and an asset identifier. The scheduling server 140 can then determine if these parameters correspond to a forecasted asset location and a forecasted asset identifier. If the asset transfer parameters correspond with the forecasted parameters, then the scheduling server 140 can confirm the intent to transfer. In this way, the scheduling server 140 can determine that the intent to transfer corresponds to a forecasted asset transfer. Alternatively, the scheduling server 140 can determine that the asset transfer parameters associated with the intent to transfer do not correspond to a forecasted parameter of a forecasted asset transfer. If one or more parameters do not correspond to a forecasted parameter, then the scheduling server 140 can determine that the asset transfer should be denied.

In various embodiments, the scheduling server 140 can communicate its determination (e.g., a confirmation or a denial of the intent to transfer) to the other systems via the network 120. Communicating its determination alerts systems participating in the transportation network to the possibility of fragmented, incomplete, or incorrect data being introduced into the operating environment 100. In some instances, this allows the system that generated the intent to transfer to supplement or correct the intent to transfer.

In various embodiments, the scheduling server 140 can generate a transaction capturing its determination (e.g., confirmation or denial) and communicate the generated transaction to the one or more nodes 150*n* for storage on a distributed ledger. In some aspects, the generated transaction can reference an intent to transfer transaction committed to the distributed ledger (e.g., through a digital address). In some embodiments, as described herein, the intent to transfer can be associated with a smart contract. Based on its determination, the scheduling server 140 can digitally sign the smart contract utilizing a cryptographic key pair to confirm the asset transfer.

Referring still to FIG. 1, the operating environment 100 may comprise an asset location system 160. The asset location system 160 is capable of detecting a location of the asset. As described herein, the asset location can be utilized as an asset transfer parameter to confirm the intent to transfer. In various aspects, one or more systems may deny the intent transaction if the asset location is either missing or incorrect. In some aspects, one or more systems may determine whether the asset location is associated with a location of the system generating the intent to transfer, such as a dispatching transportation hub.

By way of example, in some embodiments, a transportation hub server 110 communicates an intent to transfer record to one or more systems within the operating environment 100. The one or more systems can then determine whether the asset location corresponds to a location of a particular transportation hub (e.g., an originating hub or a destination hub) associated with the transportation server 110. In some embodiments, the one or more systems can utilize the identifier (e.g., sender identifier or receiver identifier) to determine a particular locus associated with the particular transportation hub. As described herein, the identifier (sender or receiver identifier) can be a physical address, digital address, alphanumeric code, or coordinates that identifies a particular transportation hub. As such, the identifier may provide a location or be linked to a location of the hub (e.g., through a database 360). The one or more systems can then reference an asset location to determine whether that the asset's location is within a predetermined boundary (e.g., particular locus) of a location for the transportation hub. It should be appreciated that this can enforce data consistency within the operating environment 100. For example, asset transfers may not be committed to the distributed ledger unless the location of the asset corresponds to the location of a particular hub involved in the asset transfer.

As a further example, in some embodiments, a transportation hub server 110 can generate or communicate an intent to transfer record based on a digital address (e.g., a sender digital address or a receiver digital address). As described herein, the digital address may include an IP address, a digital signature, a wallet address, a public key, and the like. The one or more systems within the operating environment 100 can then utilize the digital address (e.g., sender digital address or receiver digital address) to determine a particular locus associated with the particular transportation hub (e.g., an originating hub or destination hub). The one or more systems can then reference an asset location to determine whether that the asset's location is within a predetermined boundary (e.g., particular locus) of a location for the transportation hub. In turn, the one or more system can determine whether the location information of the transportation hub corresponds to the physical location of the asset.

As described herein, in various embodiments, the identifier (e.g., sender identifier or receiver identifier) of the system can be tied to a particular locus associated with a transportation hub. In some aspects, the locus may be a predetermined boundary for a particular transportation hub. By way of example, the locus can be a geo fence for a dispatching transportation hub. In some aspects, the association between the identifier and the location information for the transportation hub can be stored in a linking data store. The linking data store can be any data source that associates identifier and the location information for the of a transportation hub. For instance, the linking data store may associate the identifier (e.g., sender identifier or receiver identifier) with a geo fence of the transportation hub. It should be appreciated that the linking store may be stored in the memory of any of the systems of the operating environment 100 or committed to the distributed ledger. As described below, in various aspects, the node 150n can analyze metadata associated with an intent to transfer transaction and retrieve an identifier (e.g., a digital identifier) associated therewith.

In various embodiments, one or more systems may receive an intent to transfer record and analyze the metadata to identify the sender or receiver identifier. Once identified, the one or more systems can determine the particular locus associated therewith. The particular locus can then be compared to the asset location. For example, the coordinates of the asset location can be compared to the coordinates of a predetermined boundary associated with a hub location (e.g., a dispatching hub location). Based on determining that the particular locus corresponds to the asset location (e.g., that the location of the asset is within a predetermined boundary of the dispatching transportation hub), the one or more systems of operating environment 100 can determine whether the asset location corresponds to the particular locus of the transportation hub. By way of example, based on determining that the asset location is within a geo fence of a hub location, the one or more system of operating environment 100 can determine whether the asset location corresponds to the particular locus of the transportation hub.

While described in greater detail with reference to FIG. 4, the asset's location can be determined by the asset location system 160. The asset location system 160 can obtain location information for the asset from one or more sensors 420. In some embodiments, the one or more sensors 420 may comprise a GPS module associated with the asset. The GPS module can then obtain GPS coordinates associated with the asset. In various embodiments, the one or more sensors 420 may comprise a camera located at a transportation hub. The camera can capture an image of an asset. The captured image can then be used to determine the location of the asset. In some embodiments, the one or more sensors may comprise a wireless sensor that detects the presence of an RF signal being emitted by the asset. The asset location system 160 can then determine an asset location based on obtained sensor data.

The asset location system 160 can communicate the asset location to the other systems in a transportation network. For example, the asset location can be communicated over a network 120 to one of the transportation hub server 110, the scheduling server 140, the one or more nodes 150n, the asset monitoring server 170, or a combination thereof. One or more of these systems can then analyze the asset location information and respond accordingly. In some aspects, if it is determined that the asset location information corresponds to a location associated with an originating transportation hub, an intent to transfer can be confirmed. For example, the asset location may comprise GPS coordinates that are generated by a GPS module. The coordinates can then be stored and communicated to one or more systems. The one or more systems can then analyze the GPS coordinates to determine whether they define a location proximate to the originating transportation hub. In some aspects, the GPS coordinates correspond if they are within a predetermined geo-fence associated with the transportation hub.

Referring still to FIG. 1, the operating environment 100 may comprise one or more nodes 150n. The one or more nodes 150n can maintain a copy of one or more distributed ledgers (e.g., the distributed ledger network 600). While described in greater detail below with reference to FIGS. 6A-7, the one or more nodes 150n may receive a communication or transaction from the transportation hub server 110, the scheduling server 140, the one or more nodes 150n, the asset monitoring server 170, or a combination thereof, and commit it to storage on the one or more distributed ledgers.

As described above, the intent to transfer record may be associated with metadata. In some embodiments, the one or more nodes 150n can analyze metadata associated with an intent to transfer record to determine whether the asset location corresponds to a location of a dispatching transportation hub. For example, the metadata associated with the intent to transfer record can be a digital signature. As described with reference to FIG. 7, one or more nodes 150n can determine the digital signature associated with a generated transaction. The one or more nodes 150n can then determine a location associated with the system using that digital signature.

In some embodiments, a linking data store may be referenced by one or more systems (e.g., node 150n) of the operating environment 100 in confirming the intent to transfer. For example, the one or more system (e.g., node 150n) can receive an intent to transfer record generated by the transportation hub server 110. The node 150n can then analyze the metadata associated with the intent to transfer record to determine the digital address of the transportation hub server 110. The node 150n can then utilize the linking data store to determine a particular boundary associated with the digital address. In some aspects, the particular boundary defines a perimeter of a transportation hub (e.g., a geo fence). The nodes can then determine whether the asset location corresponds to the location of the transportation hub by determining whether the asset location (e.g., GPS coordinates) is within the particular boundary of the transportation hub.

Referring again to FIG. 1, the operating environment 100 may comprise an asset monitoring server 170. The asset monitoring server 170 can determine a state of the asset. Among other things, the state of the asset can refer to a particular status of the asset. Among other things, the status of the asset can include a loading status, a loaded status, a departure status, an en route status, an arrival status, an unloading status, an unloaded status. Based on the state of asset, the asset monitoring server 170 can confirm the intent to transfer. For example, the asset monitoring server 170 can digital sign a smart contract associated with the intent to transfer.

For example, in some embodiments, if the asset monitoring server 170 determines that the asset will be loaded or is in a loading status, the asset monitoring server 170 can confirm the intent to transfer. It should be appreciated that the asset monitoring server 170 can receive the status based on a communication from the one or more systems of operating environment 100, such as a transportation hub server 110. Additionally, the asset monitoring server may determine the status of the asset based on the asset's location, which can be communicated by the asset location system 160. Further still, the asset monitoring server may determine the status of the asset based on querying the distributed ledger maintained by the one or more nodes 150n.

Figure 2:
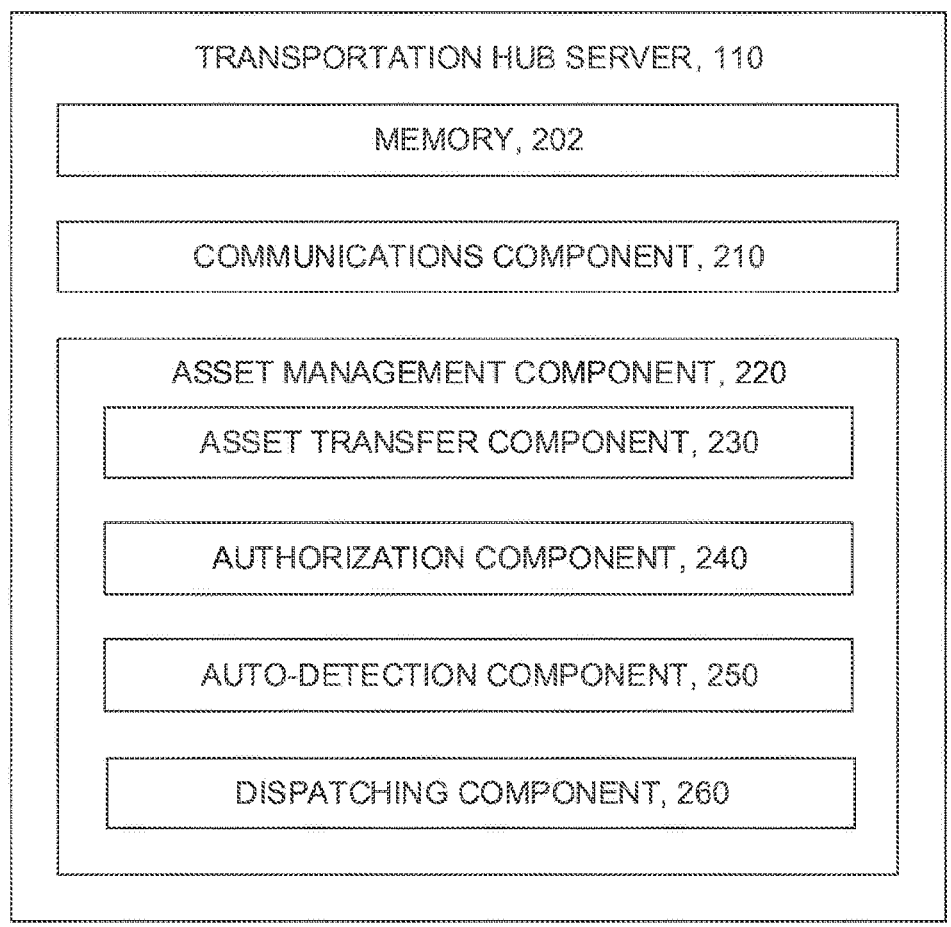
FIG. 2 is a block diagram depicting an exemplary transportation hub server in accordance with some embodiments of the present disclosure.

Turning now to FIG. 2, a block diagram of an exemplary transportation hub server 110 is depicted in accordance with some embodiments described herein. The transportation hub server 110 can be associated with one or more transportation hub locations. Generally, the transportation hub server 110 can facilitate the transportation of assets between the one or more transportation hubs. For example, in some embodiments, each transportation hub server 110 can control feeder operations for a particular transportation hub. The transportation hub server 110 can be a computing device (such as computing device 1100 of FIG. 11). In some embodiments, the transportation hub server 110 may comprise a memory 202, a communications component 210, and an asset management component 220.

The memory 202 can include any type of memory, such as a hardware storage device, random access memory (RAM), a cache, read-only memory (ROM), and the like, including any combination thereof. The memory 202 can be employed to store executable computer code that, when executed by one or more processors of the transportation hub server 110, perform operations defined or implemented within the asset management component 220. The memory 202 can also be employed to store data communicated from one or more nodes 150n, asset location systems 160, scheduling server 140, or other transportation hub servers (not shown). The data stored in memory 202 can include data generated by the transportation hub server 110 or that which is communicated by other systems of the operating environment 100.

The communications component 210 can include any type of communications device that enables the transportation hub server 110 to communicate with one or more nodes 150n, the asset location system 160, the scheduling server 140, the asset monitoring server 170, or other transportation hub servers. Communications can be facilitated utilizing wired or wireless communications, and can employ any short or long-range communications technology including, but not limited to, LANs, WANs, Ethernet, the Internet, WiFi, Bluetooth, NFC, optics (e.g., QR codes, Infrared), Zigbee, radio, RFIDs, and the like. It should be appreciated that the transportation hub server 110 can also communicate with a computing device (such as the computing device 1100 of FIG. 11) associated with a vehicle resource (e.g., an autonomous transportation vehicle or a transportation vehicle operator).

The asset management component 220 can include any number of components or subcomponents that, together with the memory 202 and communications component 210, enable the transportation hub server 110 to manage the feeder operations of a transportation hub in a transportation network. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, or software. For instance, various functions may be carried out by a processor executing instructions stored in memory.

In some embodiments, the asset management component 220 can include an asset transfer component 230. The asset transfer component 230 can generate an intent to transfer record associated with a particular asset transfer. In some aspects, the asset transfer component 230 generates an intent to transfer record based on identifying an asset to be dispatched from a first transportation hub to a second transportation hub. In generating the intent to transfer record, the asset transfer component 230 can associate the record with particular asset transfer parameters that can be referenced by other systems to confirm or deny the asset transfer. Among other things, the asset transfer parameters can include an asset transfer identifier, a departure hub location (e.g., via a sender identifier), a receiving hub location (e.g., via a receiver identifier), a location of the asset (e.g., a location as communicated by the asset location system 160 of FIG. 1), vehicle resources assigned to the asset (e.g., a vehicle operator or a vehicle identifier), an estimated date or time of transfer, or any combination thereof. The asset transfer component 230 can then communicate the intent to transfer record and the associated asset transfer parameters to the communications component 210. The communications component 210 can then communicate the intent to transfer record to the scheduling server 140, the asset location system 160, the one or more nodes 150n, the asset monitoring server 170, or another transportation hub server.

In various embodiments, the asset management component 220 comprises an authorization component 240. Among other things, the authorization component 240 can confirm/deny an intent to transfer. In some aspects, the authorization component 240 can analyze the characteristics of the asset (size, load, weight, asset identifier, vehicle identifier, and the like) associated with the asset transfer to determine whether a receiving transportation hub can accept the asset transfer. This determination can be based on available resources at the transportation hub, such as available personal, loading machinery, storage capacity, docking stations, terminals, truck bays, and the like. In some aspects, this can be automatically determined based on predetermined rules. In various aspects, this can be determined based on input from a user. The authorization component 240 can then communicate its determination to the communications component 210. In turn, the communications component 210 can communicate the transportation hub server's determination with other systems within the operating environment 100. In some aspects, the authorization component 240 can cause the transportation hub server 110 to endorse an intent to transfer.

In various aspects, the authorization component 240 can query a distribute ledger for one or more transactions. In some aspects, the authorization component 240 can query the distributed ledger for an intent to transfer record. The distributed ledger can be maintained by one or more nodes, such as one or more nodes 150n of FIG. 1. In some aspects, the authorization component 240 can search for an identifier (such as a receiver identifier or a sender identifier) associated with a transportation hub involved in the transfer of the asset. The receiver identifier can be any identifier that identifies a transportation hub receiving the asset. In some aspects, the receiver identifier is a identifier associated a transportation hub server managing the receiving transportation hub, including an IP address, a wallet address, an alphanumeric code, and the like. The sender identifier can be any identifier that identifies a transportation hub sending the asset. In some aspects, the sender identifier is a identifier associated a transportation hub server managing the originating transportation hub, including an IP address, a wallet address, an alphanumeric code, and the like. The authorization component 240 can then identify whether an intent to transfer transaction requires confirmation from the transportation hub server 110 and respond accordingly. For example, the authorization component 240 can cause the transportation hub server 110 (or a node associated therewith) to generate a confirmation of asset transfer transaction 620 indicating the transportation hub server's confirmation (or denial).

As described herein, the intent to transfer record can be associated with a smart contract that requires confirmation from a transportation hub server 110 (e.g., a server associated with a receiving transportation hub). In order to be executed, the smart contract can require, as a conditions precedent, that the intent to transfer is authorized by a transportation hub associated with the asset transfer (e.g., a sending or receiving transportation hub). In actuality, the intent to transfer is authorized by transportation hub server 110 as the one or more nodes 150n can validate the digital signature of the particular transportation hub server authorizing the asset transfer in order to verify the transaction. In various embodiments, the authorization component 240 can cause the transportation hub server 110 to digitally sign the smart contract (e.g., via a node associated with the transportation hub server 110) based on confirming the intent to transfer. As such, in some embodiments, the smart contract can require the authorization of a transportation hub server 110 associated with a sending or receiving transportation hub.

In various embodiments, the asset management component 220 comprises an auto-detection component 250. The auto-detection component 250 can automatically identify whether an asset has departed or arrived at a particular hub location. For example, communicating with one or more sensors 420 (such as the sensors described with reference to the asset location system 160), the auto-detection component 250 can identify whether an asset has departed or arrived. Additionally, the auto-detection component 250 can retrieve an asset identifier based on visual indicators on a vehicle (e.g., a license plate) or wireless signal (e.g., RFID signal) to identify the asset that has departed or arrived. The auto-detection component 250 can then communicate its determination to the other components of the transportation hub server 110. In some aspects, the auto-detection component 250 can cause the transportation hub server 110 to generate an asset dispatch transaction for storage on a distributed ledger, such as the asset dispatch transaction 640 of FIG. 6B. In some aspects, the auto-detection component 250 can cause the transportation hub server 110 to generate an asset arrival transaction for storage on a distributed ledger, such as the asset arrival transaction 650 of FIG. 6B.

In some aspects, the auto-detection component 250 can communicate its determination to the asset transfer component 230. In various aspects, the asset transfer component 230 can then generate an intent to transfer based on the automatic detection of an asset's departure or arrival. The auto-detection component 250 can also communicate the departure or arrival of the asset to the communications component 210. In turn, the communications component 210 can communicate the departure or arrival of the asset to other systems of a transportation network, including other transportation hub servers, the scheduling server 140, the asset location system 160, the asset monitoring server 170, or one or more nodes 150n or any combination thereof. It should be appreciated that, in some embodiments, the asset monitoring server 170 can determine the state of the asset based on determinations of the auto-detection component 250.

In various embodiments, the asset management component 220 comprises a dispatching component 260. In general, the dispatching component 260 can ensure there is proper dispatch of an asset from an originating transportation hub location. Additionally, the dispatching component 260 can communicate with a computing device associated with the vehicle resources transferring the asset (e.g., a vehicle operator computing device), instructing the vehicle resource to proceed with the asset transfer.

In some aspects, the dispatching component 260 can utilize one or more asset transfer parameters to facilitate the proper dispatch of an asset. For example, the dispatching component 260 can ensure that the asset being transferred includes a confirmed asset identifier, a confirmed vehicle resource (e.g., vehicle identifier or vehicle operator), a confirmed time dispatch, a confirmed destination hub location, and the like, as indicated by a intent to transfer record. It should be appreciated that the dispatching component 260 can retrieve the confirmed asset transfer parameters associated with an intent to transfer record that is confirmed by one or more systems (e.g., the scheduling server 140, the asset location system 160, a transportation hub server associated with a destination hub location, an asset monitoring server 170, or any combination thereof). In various embodiments, the dispatching component 260 can query one or more systems to determine whether the intent to transfer has been confirmed. If the intent to transfer has not been confirmed, the dispatching component 260 can communicate with one or more systems that have yet to confirm the intent to transfer. If the intent to transfer is confirmed, the dispatching component 260 can facilitate the asset transfer according to the asset transfer parameters associated with the confirmed asset transfer. For example, the dispatching component 260 can identify the asset transfer parameters associated with a confirmed asset transfer and issue a communication to dispatch the asset. In some embodiments, the dispatching component 260 can identify confirmed asset transfer parameters that are associated with a smart contract that has been verified by the one or more systems. In some embodiments, the dispatching component 260 can query transactions (e.g., transactions 602N of FIG. 6A-B) on a distributed ledger for confirmed asset transfer parameters.

Figure 3:
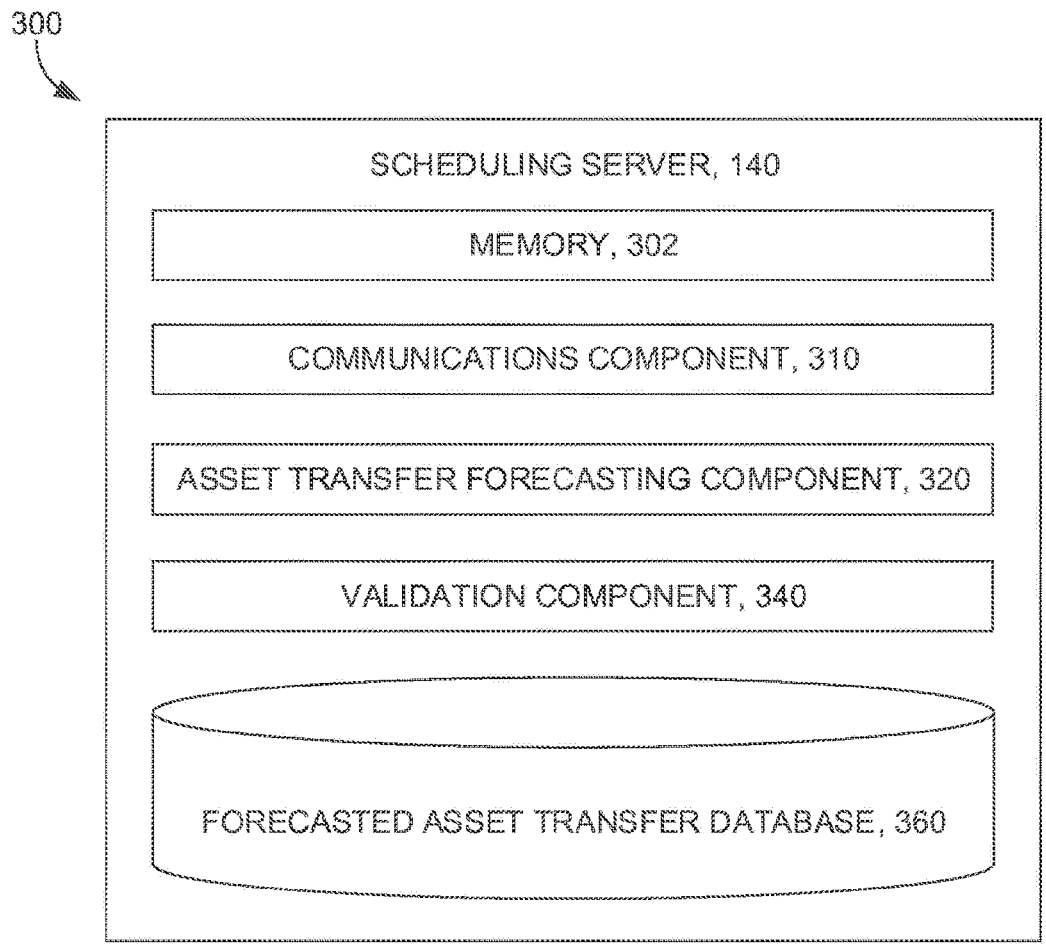
FIG. 3 is a block diagram depicting an exemplary scheduling server in accordance with some embodiments of the present disclosure.

Turning now to FIG. 3, a block diagram 300 of an exemplary scheduling server 140 is depicted in accordance with some embodiments described herein. Generally, the scheduling server 140 can maintain a forecasted asset transfer database 360 that stores a scheduled asset transfer (also referred to as a forecasted asset transfer). Additionally, the forecasted asset transfer database 360 may store one or more asset transfer parameters associated with the scheduled asset transfer. As such, in some embodiments, the scheduling server 140 can maintain a forecasted asset transfer record for transferring an asset from one transportation hub location to another. The scheduling server 140 can therefore provide a common schedule for asset transfers across the transportation network. Additionally, the scheduling server 140 can confirm or deny an asset transfer. As described herein, the scheduling server 140 can confirm an asset transfer based on determining that the asset transfer correspond to a forecasted asset transfer. In some embodiments, the scheduling server 140 can digitally sign a smart contract associated with the intent to transfer.

In some aspects, the forecasted asset transfer is associated with one or more forecasted asset transfer parameters. The forecasted asset transfer parameters can generally involve the same type of parameters as the intent to transfer parameters. Among other things, the forecasted asset transfer parameters can comprise one of an asset identifier, asset location, a departure hub location, a receiving hub location, vehicle resources, an estimated date or time of transfer, or any combination thereof.

The scheduling server 140 can be a computing device, such as the computing device 1100 that is described in accordance with FIG. 11. In some aspects, the scheduling server 140 may comprise one of memory 302, a communications component 310, an asset transfer forecasting component 320, a validation component 340, a forecasted asset transfer database 360, or any combination thereof. The memory 302 can include any type of memory, such as a hardware storage device, random access memory (RAM), a cache, read-only memory (ROM), and the like, including any combination thereof. The memory 302 can be employed to store executable computer code that, when executed by one or more processors of the scheduling server, perform operations defined or implemented within the asset transfer forecasting component 320, or the validation component 340. The memory 302 can also be employed to store data communicated from the transportation hub server 110, the asset location system 160, the asset monitoring server 170, or nodes 150n. The data stored in memory can also include data generated by the scheduling server 140.

The communications component 310 can include any type of communications device that enables the scheduling server 140 to communicate with one or more nodes 150n, the asset location system 160, the asset monitoring server 170, or the transportation hub server 110. Communications can be facilitated utilizing wired or wireless communications, and can employ any short or long-range communications technology including, but not limited to, LANs, WANs, Ethernet, the Internet, WiFi, Bluetooth, NFC, optics (e.g., QR codes, Infrared), Zigbee, radio, RFIDs, and the like. It should be appreciated that the scheduling server 140 can also communicate with a computing device (such as the computing device 1100 of FIG. 11) associated with a vehicle resource (e.g., an autonomous transportation vehicle or a transportation vehicle operator).

The scheduling server 140 can include any number of components or subcomponents that, together with the memory 302 and communications component 310, enable the scheduling server 140 to maintain a forecasted asset transfer. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, or software. For instance, various functions may be carried out by a processor executing instructions stored in memory.

In some embodiments, the scheduling server 140 may comprise an asset transfer forecasting component 320. The asset transfer forecasting component 320 can generate a record for a forecasted asset transfer. The forecasted asset transfer record can identify the one or more asset transfer parameters that will be used in a future asset transfer. In some aspects, the forecasted asset transfer record can be generated automatically, along with the associated asset transfer parameters, based on predefined rules or a predefined algorithm. In some aspects, the record of the forecasted asset transfer can be generated manually based on input from a user.

To facilitate the generation of the forecasted asset transfer record, the asset transfer forecasting component 320 can retrieve available resources within the transportation network, either from memory 302 or by querying one or more systems of the transportation network. By way of example, the available resources can include one of vehicle operators, vehicle resources (such as a truck, ship, or airplane), assets, resources associated with a transportation hub location, and the like.

In some aspects, the asset transfer forecasting component 320 can query one or more systems (e.g., a forecasted asset transfer database 360, asset monitoring system 170, or the transportation hub server 110) to determine the available resources. Additionally, in some aspects, the asset transfer forecasting component 320 can query one or more distributed ledgers, such as a distributed ledger maintained by the one or more nodes 150n, for the available resources. In response to either an automatic determination or user input, the asset transfer forecasting component 320 can generate the record of the forecasted asset transfer that identifies one or more forecasted asset transfer parameters. In some embodiments, the asset transfer forecasting component 320 can cause the forecasted asset transfer record (along with the forecasted asset parameters) to be displayed on a client device, such as the computing device 1100 of FIG. 11.

Once generated, the asset transfer forecasting component 320 can commit the forecasted asset record to storage. In some aspects, the asset transfer forecasting component 320 commits the forecasted asset transfer record to storage in the forecasted asset transfer database 360. In some aspects, the forecasted asset transfer database 360 can be stored in the memory 302 of the scheduling server. In some aspects, the asset transfer forecasting component 320 generates a transaction to store the forecasted asset transfer record on one or more distributed ledgers, such as a distributed ledger maintained by one or more nodes 150n. For example, the asset transfer forecasting component 320 can communicate the forecasted asset transfer record to one or more nodes 150n. The one or more nodes 150n can then commit the forecasted asset transfer record along with the forecasted asset transfer parameters for storage on a distributed ledger. By way of example, the forecasted asset transfer can be stored as a forecasted asset transfer transaction 660, as described in reference to FIG. 6B.

In some aspects, the asset transfer forecasting component 320 can determine whether there is a conflict in the available resources to transfer the asset. That is, the scheduling server 140 can determine whether there is a conflict between a first available vehicle resource that is assigned to a first asset transfer and a second vehicle resource that is assigned to a second asset transfer. For instance, the vehicle resource may be associated with a vehicle operator resource (e.g., a driver). The asset transfer forecasting component 320 can determine if the vehicle operator resources exceed a threshold. For example, if the vehicle operator is assigned to one or more asset transfers that will cause the vehicle operator hours worked to exceed a threshold, then the asset transfer forecasting component 320 can respond accordingly (e.g., alert a user or assign the vehicle operator to a different asset transfer). Additionally, the asset transfer forecasting component 320 can determine whether the vehicle operator has been or will be dispatched. As for assigning a particular vehicle (a truck, a trailer, an airplane, a train, a ship, and the like), the scheduling server can determine whether there is a conflict by assigning the same vehicle to different asset transfers. As such, in some aspects, the scheduling server 140 can determine whether the particular vehicle assigned to the asset transfer will conflict with the same vehicle assigned to different asset transfer. By way of example, the scheduling server 140 can analyze a particular vehicle identifier that is assigned to the asset transfer. If the vehicle identifier is assigned to two different asset transfers, the asset transfer forecasting component 320 can respond accordingly (e.g., alert a user or assign the vehicle operator to a different asset transfer).

In some embodiments, the scheduling server 140 may comprise a validation component 340. In general, the validation component 340 analyzes an intent to transfer record to determine whether it corresponds to a forecasted asset transfer record. The validation component 340 can also identify an intent to transfer record that requires a confirmation from the scheduling server 140. In some aspects, the validation component 340 can identify the intent to transfer record that was received from one or more systems over a network (e.g., network 120 of FIG. 1) via a communications component 310. For example, the intent to transfer record can be received over a network 120 from the transportation hub server 110. The validation component 340 can then communicate the determination of the asset transfer forecasting component 320 to one or more systems of the operating environment 100.

In various aspects, the validation component 340 can query a distribute ledger for the intent to transfer record (e.g., an intent to transfer transaction 610, as described with reference to FIG. 6B), where the distributed ledger is maintained by one or more nodes, such as one or more nodes 150n of FIG. 6. As described herein, the intent to transfer record can be associated with a smart contract that requires confirmation from the scheduling server 140. In other words, the smart contract can require (e.g., as a condition precedent) that the asset transfer associated with the intent to transfer corresponds to a forecasted asset transfer.

In some embodiments, the validation component 340 can query the distributed ledger to identify the intent to transfer record that requires the scheduling server's confirmation. By way of example, the validation component 340 can search for an identifier (e.g., a digital address, IP address, a wallet address, and the like) associated with the scheduling server 140 to identify an intent to transfer record.

Once an intent to transfer record is identified (either stored on the distributed ledger or communicated with the scheduling server 140), the validation component 340 can determine the accuracy of the intent to transfer record. In some aspects, the validation component 340 can analyze the intent to transfer record to determine whether it corresponds with a forecasted asset transfer record. Among other things, the validation component 340 can identify asset transfer parameters associated with the intent to transfer record and determine if they align or conflict with the forecasted asset parameters. For example, the validation component 340 can determine if there is a conflict between an asset transfer identification, a departure hub location, a receiving hub location, a location of the asset, vehicle resources assigned to the asset (e.g., a vehicle operator or a vehicle identifier), or an estimated date or time of transfer, or any combination thereof. Based on determining that the records have corresponding asset transfer parameters, the validation component 340 can confirm the asset transfer. Alternatively, if the validation component 340 determines that there is a conflict between one or more of asset transfer parameters and the one or more forecasted asset transfer parameters, then the validation component 340 can deny the asset transfer.

In various aspects, the validation component 340 can communicate its determination to other systems of the operating environment 100. In some aspects, the validation component 340 determines that the intent to transfer record should be confirmed. The validation component 340 can then communicate its confirmation to the one or more systems. In some aspects, the confirmation can be communicated to the transportation hub server 110. Additionally, the confirmation can be communicated to one or more nodes 150n for storage on a distributed ledger (such as a forecasted asset transfer transaction 660 or as a confirmation of asset transfer transaction 620, as described with reference to FIG. 6B).

As described herein, the intent to transfer record can be associated with a smart contract. The validation component 340 can analyze one or more fields of the smart contract to determine if the intent to transfer corresponds to a forecasted asset transfer. The intent to transfer may correspond to a forecasted asset transfer based on the intent to transfer parameters aligning with all the forecasted asset transfer parameters. The scheduling server 140 can then confirm the intent to transfer. In some aspects, the scheduling server's signature may be a conditions precedent for the smart contract. The validation component 340 can cause the scheduling server 140 (e.g., via a node associated therewith) to digitally sign the smart contract based on determining that the intent to transfer corresponds to a forecasted asset transfer.

Similarly, in some aspects, the validation component 340 determines that the intent to transfer record should be denied. The denial of the validation component 340 can then be communicated to the one or more systems. It should be appreciated that the details as to why the validation component 340 denied the intent to transfer may also be communicated. In some aspects, the intent to transfer record may be associated with a smart contract, the validation component 340 can then generate a transaction indicating its denial of the intent to transfer. For example, the generated transaction can reference the smart contract address such that other systems can identify that the scheduling system has considered the intent to transfer. It should be appreciated that the details as to why the validation component 340 denied the intent to transfer can be stored in the generated transaction.

Figure 4:
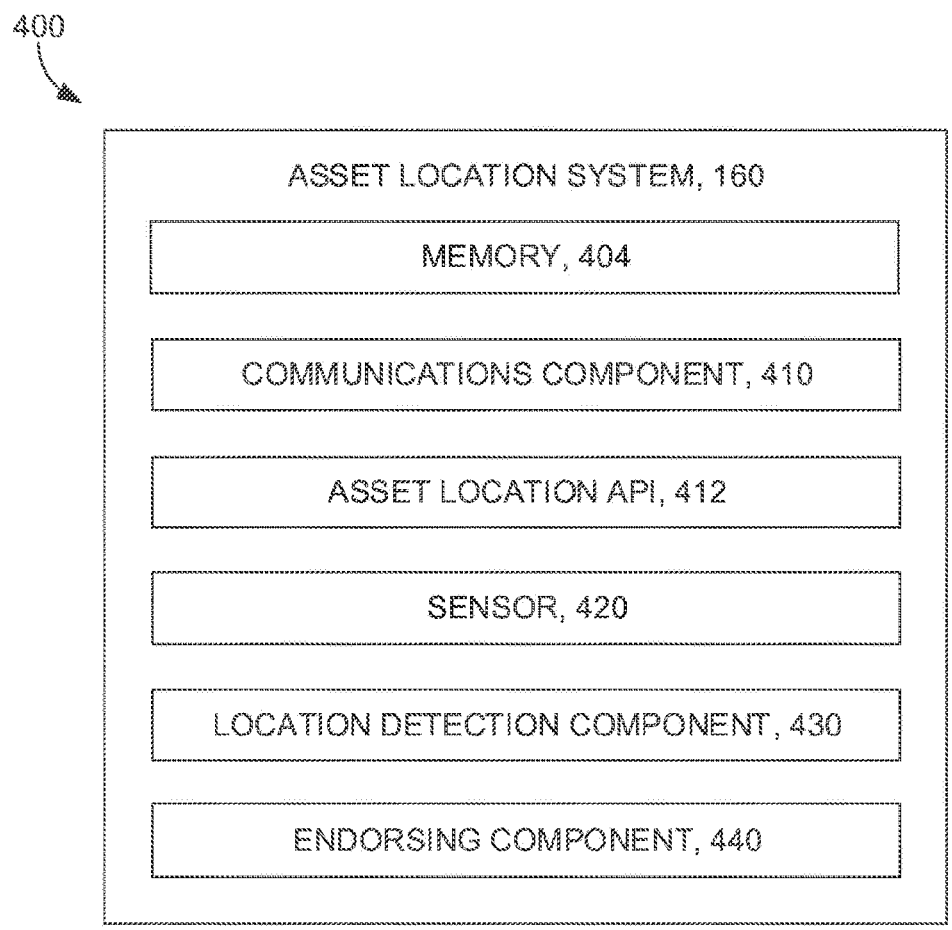
FIG. 4 is a block diagram depicting an exemplary asset location system in accordance with some embodiments of the present disclosure.

Turning now to FIG. 4, a block diagram 400 of an exemplary asset location system 160 is depicted in accordance with some embodiments described herein. The asset location system 160 can determine the location of the asset. Additionally, the asset location system 160 can communicate the location of the asset to one or more systems, including one of the transportation hub server 110, the scheduling server 140, the one or more nodes 150n, the asset monitoring server 170, or any combination thereof. The asset location system 160 can communicate the location of the asset on a regular basis, at predetermined events or interval time periods. In some aspects, the predetermined event may correspond to a departure or arrival of an asset at a particular hub location. By way of example only, the predetermined event can be the asset crossing a predefined geo fence. Among other things, this may be determined based on GPS coordinates reported by a GPS module associated with the asset being located outside of the coordinates of the geo fence. As an additional example, the predetermined event can be a visual sensor (e.g., a camera) located at the particular hub location boundary (e.g., a gate, truck bay, loading dock, terminal) detecting the entrance or exit of an asset. In yet a further example, the predetermined event can be a proximity sensor (e.g., an RFID, weight sensor) detecting the presence (e.g., within a detectable range) or absence (e.g., outside of a detectable range) of the asset.

As described herein, the location of an asset can be utilized in confirming an intent to transfer. For example, in some aspects, an intent to transfer can be associated with a smart contract. As described in greater detail below, the smart contract can require the location of the asset to be identified or confirmed as a condition precedent. In some aspects, the smart contract can require the digital signature of the asset location system 160. This can ensure that inaccurate data is not introduced into the distributed ledger.

In some aspects, the asset location system 160 may comprise one of memory 404, a communications component 410, an asset location application program interface (API) 412, one or more sensors 420, a location detection component 430, and an endorsing component 440. The memory 404 can include any type of memory, such as a hardware storage device, random access memory (RAM), a cache, read-only memory (ROM), and the like, including any combination thereof. The memory 404 can be employed to store executable computer code that, when executed by one or more processors of the asset location system 160, perform operations defined or implemented within the asset location API 412, the location detection component 430, or the endorsing component 440. The memory 404 can also be employed to store data communicated from the transportation hub server 110, the scheduling server 140, or nodes 150n. The data stored in memory can include, among other things, data generated by the asset location system 160, including sensor data obtained by the sensor 420, locations associated with the sensor data, locations identified by the location detection component 430, and other types of electronic data not limited to the foregoing.

The communications component 410 can include any type of communications device that enables the asset location system 160 to communicate with one or more nodes 150n, the scheduling server 140, the asset monitoring system 170, or the transportation hub server 110. Communications can be facilitated utilizing wired or wireless communications, and can employ any short or long-range communications technology including, but not limited to, LANs, WANs, Ethernet, the Internet, WiFi, Bluetooth, NFC, optics (e.g., QR codes, Infrared), Zigbee, radio, RFIDs, and the like. It should be appreciated that the scheduling server 140 can also communicate with a computing device (such as the computing device 1100 of FIG. 11) associated with a vehicle resource (e.g., an autonomous transportation vehicle or a transportation vehicle operator). It should be appreciated that the asset monitoring system may include one or more similar components as computing device 1100 that is described in accordance with FIG. 11.

The asset location system 160 can include any number of components or subcomponents that, together with the memory 404 and communications component 410, enable the asset location system 160 to generate a location of the asset. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, or software. For instance, various functions may be carried out by a processor executing instructions stored in memory.

In some embodiments, the asset location system 160 may comprise an asset location API 412. For example, the API can be downloaded onto a computing component of a smart asset (such as a computing device 1100, as described in accordance with FIG. 11). A smart asset can comprise any IoT asset capable of transporting a physical object. In some aspects, the smart asset can be a smart storage container that is capable of detecting a location of the asset (e.g., via a GPS signal) and communicating that location to one or more computing devices. Accordingly, the asset location API 412 can communicate with one or more sensors (such as sensor 420) associated with the asset to detect the asset location. In turn, the asset location API 412 can utilize the communications component 410 to communicate the location information to one or more system, including one of the transportation hub server 110, the scheduling server, 140, one or more nodes 150n, or any combination thereof.

In some embodiments, the asset location system 160 may comprise a sensor 420. The asset location system 160 may also comprise a location detection component 430. The sensor 420 can be any device(s) capable of detecting input that can be utilized by a location detection component 430 to generate a location of the asset. The sensor module can be located at a physical locus of a transportation hub, coupled to the asset, or a combination thereof. Among other things, the sensor 420 can be a GPS module, a camera, a proximity sensor, a wireless beacon, or a wireless access point, or a combination thereof. By way of example, the input detected by the sensor 420 can be coordinates defining a location associated with the asset, an image of the asset, a wireless signal of the asset, or a combination thereof. The location sensor's input can then be analyzed by the location detection component 430 to generate the location of the asset. In some aspects, the sensor 420 can be a proximity sensor located at a hub location that detects a wireless signal generated by the asset. The location detection component 430 can then generate the location of the asset based on detecting the wireless signal generated by the asset. In various aspects, the sensor 420 can be a camera that captures an image of the asset at a particular bay of a transportation hub. The location detection component 430 can then perform an image recognition analysis to identify the asset through visual indicators (e.g., a license plate). In some aspects, the sensor 420 is a GPS device coupled to the asset. The signals received by the GPS device can then be used to define the asset location.

Based on obtaining the asset location, the location detection component 430 can communicate the location of the asset to one or more other systems. In some embodiments, the location detection component 430 communicates the asset location along with one or more asset parameters. For instance, the location detection component 430 communicates the asset location along with an asset identifier.

In some embodiments, the asset location system 160 may comprise an endorsing component 440. In general, the endorsing component 440 can rely on data from the sensor 420 or the determination of the location detection component 430, or both, to facilitate the confirmation of the asset location associated with an intent to transfer record. In some aspects, the endorsing component 440 can generate a transaction of a detected location of the asset for storage on a distributed ledger maintained by one or more nodes 150n. In some aspects, the endorsing component 440 can generate a transaction identifying the asset location for storage on the distributed ledger, such as an asset location transaction 630 as described in reference to FIG. 6B. The one or more nodes 150n can then commit the asset location to one or more transactions on the distributed ledger.

As described herein, in some aspects, the intent to transfer can be associated with a smart contract. Among other things, the smart contract can require an asset location to be identified (e.g., as a conditions precedent) in order to be executed. Additionally, the smart contract can require an asset location system digitally sign the smart contract (e.g., as a conditions precedent) in order to be executed. The endorsing component 440 can analyze the smart contract to determine if it comprises a field for the asset location, thereby indicating that the asset location is an asset transfer parameter required by the smart contract. In some aspects, the endorsing component 440 provides the asset location in order to execute the smart contract. In some aspects, the endorsing component 440 can digitally sign the smart contract (e.g., via a node associated with the asset location system 160) based on determining that the asset location indicated by the smart contract is accurate. In some embodiments, the asset location system 160 can query a distributed ledger to identify an intent to transfer requires an action from the asset location system 160. In some aspects, the endorsing component 440 can search for an identifier (digital address, alphanumeric code, wallet address, and the like) associated with the asset location system 160.

Additionally, in some embodiments, the endorsing component 440 can determine whether the location of the asset corresponds to a location associated with the transportation hub (e.g., an originating transportation hub or receiving transportation hub). As described herein, the location of the asset corresponds to a particular transportation hub in a variety of ways. For example, the endorsing component 440 can determine whether the asset location is proximate to a transportation hub location (e.g., originating or receiving hub location) identified in an intent to transfer record (e.g., via a sender or receiver identifier). In other words, the endorsing component 440 may compare a known location (e.g., address, GPS coordinates, and the like) of the transportation hub (e.g., a transportation hub dispatching or receiving the asset) with an asset location, which can also be identified in the intent to transfer record. The endorsing component 440 can then determine whether the asset location is within a particular locus of the transportation hub. In some aspects, as a result of the determination, the endorsing component 440 generates a confirmation of asset transfer. In some aspects, the confirmation of the asset transfer can be stored as a confirmation of the asset transfer transaction 620, indicating the asset location system's 160 approval of the intent to transfer. In addition, the endorsing component 440 can cause the location system 160 to digitally sign a smart contract associated with the intent to transfer.

Figure 5:
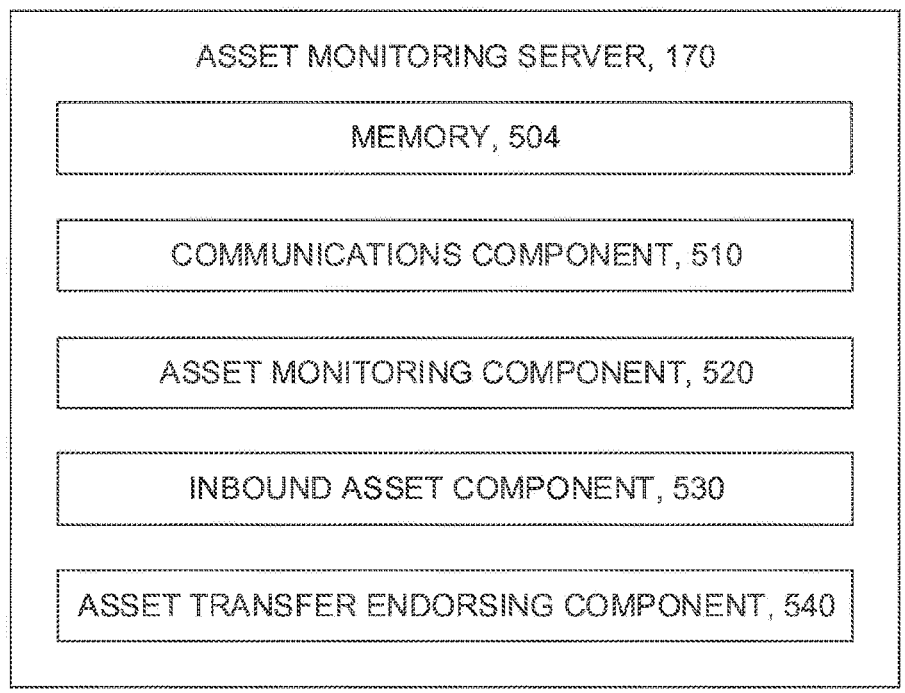
FIG. 5 is a block diagram depicting an exemplary asset monitoring server in accordance with some embodiments of the present disclosure.

Referring now to FIG. 5, a block diagram 500 of an exemplary asset monitoring server 170 is depicted in accordance with some embodiments described herein. An asset monitoring server 170 generally determines whether a physical asset transfer between transportation hubs aligns the digital record of the asset transfer (e.g., an intent to transfer record). As described in more detail herein, in some embodiments, the asset monitoring server 170 can determine the state of the asset. Based on the state of the asset, the asset monitoring server 170 can confirm an intent to transfer. It should be appreciated that the asset monitoring component 350 can provide further validation that a physical asset transfer corresponds with an electronic record of the asset transfer.

The asset monitoring server 170 can be a computing device, such as the computing device 1100 that is described in accordance with FIG. 11. In some aspects, the asset monitoring server 170 may comprise one of memory 504, a communications component 510, an asset monitoring component 520, an inbound asset component 530, an asset transfer endorsing component 540, or any combination thereof. The memory 504 can include any type of memory, such as a hardware storage device, random access memory (RAM), a cache, read-only memory (ROM), and the like, including any combination thereof. The memory 504 can be employed to store executable computer code that, when executed by one or more processors of the asset monitoring server 170, perform operations defined or implemented within the asset monitoring component 520, the inbound asset component 530, or the asset transfer endorsing component 540. The memory 504 can also be employed to store data communicated from the transportation hub server 110, the scheduling server 140, the asset location system 160, or nodes 150*n*. The data stored in memory can also include data generated by the asset monitoring server 170.

The communications component 510 can include any type of communications device that enables the asset monitoring server 170 to communicate with one or more nodes 150*n*, the asset location system 160, the scheduling server 140, or the transportation hub server 110. Communications can be facilitated utilizing wired or wireless communications, and can employ any short or long-range communications technology including, but not limited to, LANs, WANs, Ethernet, the Internet, WiFi, Bluetooth, NFC, optics (e.g., QR codes, Infrared), Zigbee, radio, RFIDs, and the like. It should be appreciated that the asset monitoring server 170 can also communicate with a computing device (such as the computing device 1100 of FIG. 11) associated with a vehicle resource (e.g., an autonomous transportation vehicle or a transportation vehicle operator).

The asset monitoring server 170 can include any number of components or subcomponents that, together with the memory 504 and communications component 510, enable the asset monitoring server 170 to determine whether a physical asset transfer between transportation hubs aligns the digital record of the asset transfer. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, or software. For instance, various functions may be carried out by a processor executing instructions stored in memory.

The asset monitoring server 170 may comprise an asset monitoring component 520. The asset monitoring component 520 can determine a state of the asset. Among other things, the state of the asset can refer to a particular status of the asset. By way of example, the status of the asset can include a loading status, a loaded status, a departure status, an en route status, an arrival status, an unloading status, or an unloaded status.

The state of the asset can be determined based on monitoring communications within the operating environment 100. That is, the asset monitoring component can intercept any communications distributed through the network 120 regarding a particular asset or asset transfer. For example, the asset monitoring component 520 can monitor communications between the two transportation hub servers within the operating environment 100.

Additionally, the state of the asset can be determined based on querying one or more systems within the operating environment 100. That is, the asset monitoring component 520 can query the one or more systems within the operating environment 100 for information related to a particular asset identifier or asset transfer. For example, the asset monitoring component 520 can query the asset location systems 160, one or more nodes 150*n*, the scheduling server 140, or transportation server 110 for information regarding a particular asset or asset transfer. Based on information regarding a particular asset or asset transfer, the asset monitoring component 520 can determine a particular state of the asset.

In some embodiments, the asset monitoring component 520 can determine whether an asset is in a loading status or a loaded status. Similarly, the asset monitoring component 520 can determine whether an asset is in an unloading status or an unloaded status. For example, the asset monitoring component 520 can determine whether an asset is located at a particular loading bay. Additionally, the asset monitoring component 520 can determine whether a door of an asset is open. As a further example, the asset monitoring component 520 can determine whether particular resources (e.g., loaders) are attending to the asset. It should be appreciated that these determinations can be based on intercepted communications or a query the one or more systems within the operating environment 100.

In some embodiments, the asset monitoring component 520 can determine whether an asset is in a departed status, an en route statues, or an arrived status. For example, the asset monitoring component 520 can determine whether an asset has departed or arrived at a particular loading bay of a transportation hub. Additionally, the asset monitoring component 520 can determine whether the asset has departed or arrived based a particular boundary (e.g., a geo fence) of a transportation hub. As a further example, the asset monitoring component 520 can determine whether the asset is moving or is located between two transportation hubs. It should be appreciated that these determinations can be based on intercepted communications or a query the one or more systems within the operating environment 100. For instance, the asset monitoring component 520 can identify the departure of the asset based on receiving a communication from a transportation hub server 110 associated with the originating transportation hub location. Additionally, the asset monitoring component 520 can identify the departure of the asset based on querying an asset location system associated with the asset by compare the asset location with location information of the originating or destination transportation hub.

In addition, in some embodiments, the asset monitoring component 520 can query a distributed ledger to determine various asset transfer parameters and determine whether the asset has been (or is in process) of physically being transferred between hub locations. For example, the asset monitoring component 520 can query the distributed ledger network 600 of FIG. 6A-B to determine the state of the asset.

The asset monitoring server 170 may comprise an inbound asset component 530. In general, the inbound asset component 530 can notify the one or more system within the operating environment 100 of the departure status of the asset. The inbound asset component 530 can communicate with the asset monitoring component 520 to determine that an asset has been dispatched from an originating transportation hub location.

In some aspects, the inbound asset component 530 can notify a receiving transportation hub server 110 of an inbound asset. It should be appreciated that the communication can identify the one or more asset transfer parameters associated with the asset transfer. Hence, the inbound asset component 530 can ensure that a transportation hub server 110 associated with the destination hub is aware of an inbound asset. This allows the destination hub to allocate resources accordingly.

The asset monitoring server 170 may comprise an asset transfer endorsing component 540. The asset transfer endorsing component 540 can confirm an intent to transfer record. The intent to transfer can be confirmed based on the asset parameters associated with an asset transfer corresponding to the state of the asset. For example, the asset transfer endorsing component 540 can identify one or more asset transfer parameters from a record of an intent to transfer that is received by the asset monitoring server 170. The asset transfer endorsing component 540 can extract the asset parameters. Additionally, the asset transfer endorsing component 540 can receive the state of the asset from the asset monitoring component 520. Based on determine the state of the asset corresponding to one or more asset parameters, the asset transfer endorsing component 540 can confirm the intent to transfer. For example, the asset transfer endorsing component 540 can compare whether the asset is in a loading status at a particular hub and then determine if it corresponds to dispatching the asset from that particular hub. The asset transfer endorsing component 540 can thus rely compare the different statuses of the asset (e.g., whether the asset has departed, arrived, en route, and the like) with the intent to transfer to determine whether they correspond. It is contemplated that the asset transfer endorsing component 540 can communicate its determination to the other systems of the operating environment 100.

In some embodiments, the asset transfer endorsing component 540 can cause the asset monitoring server 170 to digitally sign a smart contract. In other words, if an intent to transfer is associated with a smart contract, the asset transfer endorsing component 540 can digitally sign the smart contract (e.g., via a node associated therewith). It is contemplated that the digital signature of the asset monitoring server 170 can be a conditions precedent for a smart contract. Additionally, it is contemplated that the asset monitoring server 170 can generate a transaction of confirmation as to the state of the asset for storage on a distributed ledger (such as a confirmation of asset transfer transaction 620).

Figure 6A:
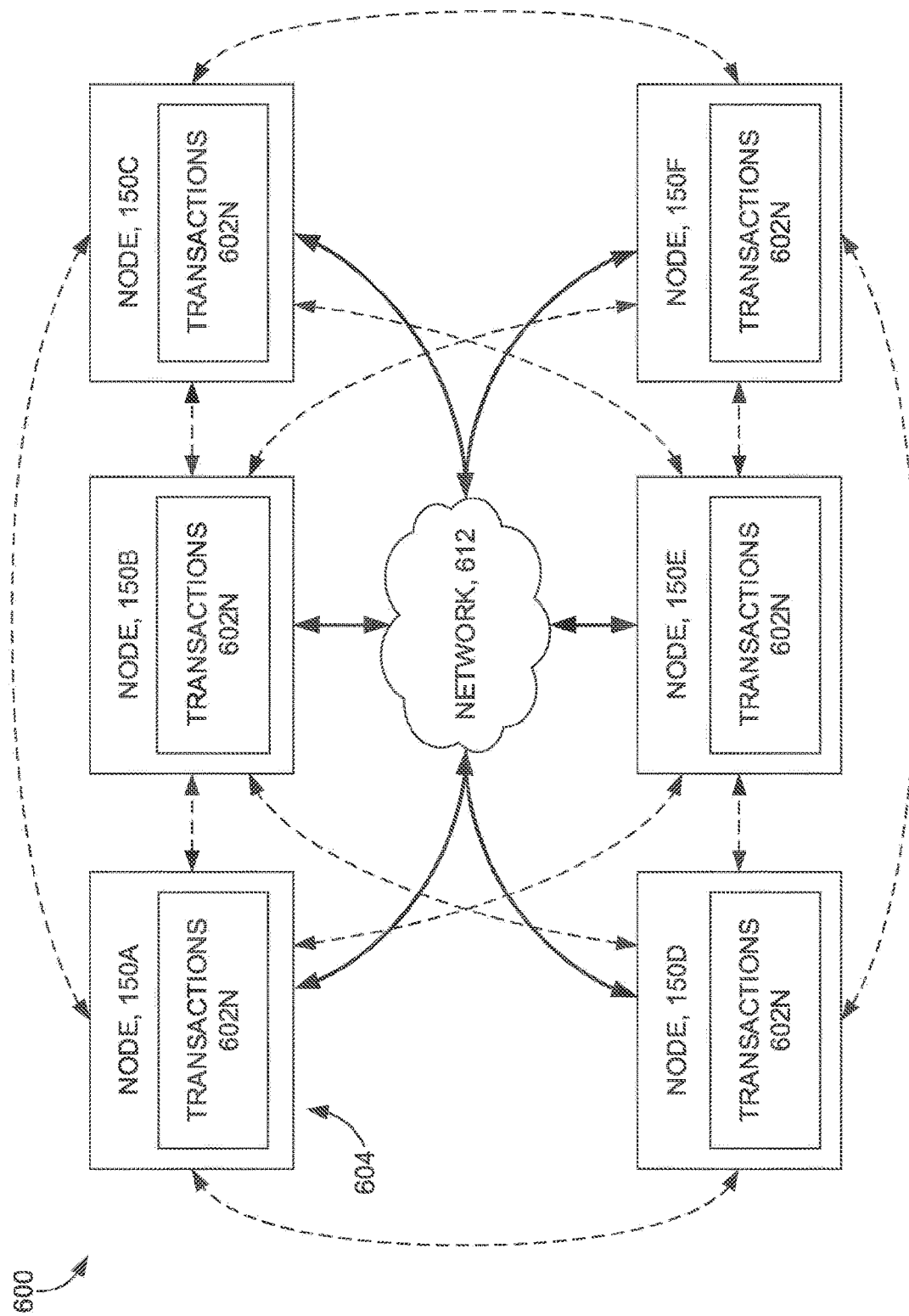
FIGS. 6A-B are exemplary schematic depictions of a distributed ledger network having one or more transactions in accordance with some embodiments of the present disclosure.
Figure 6B:
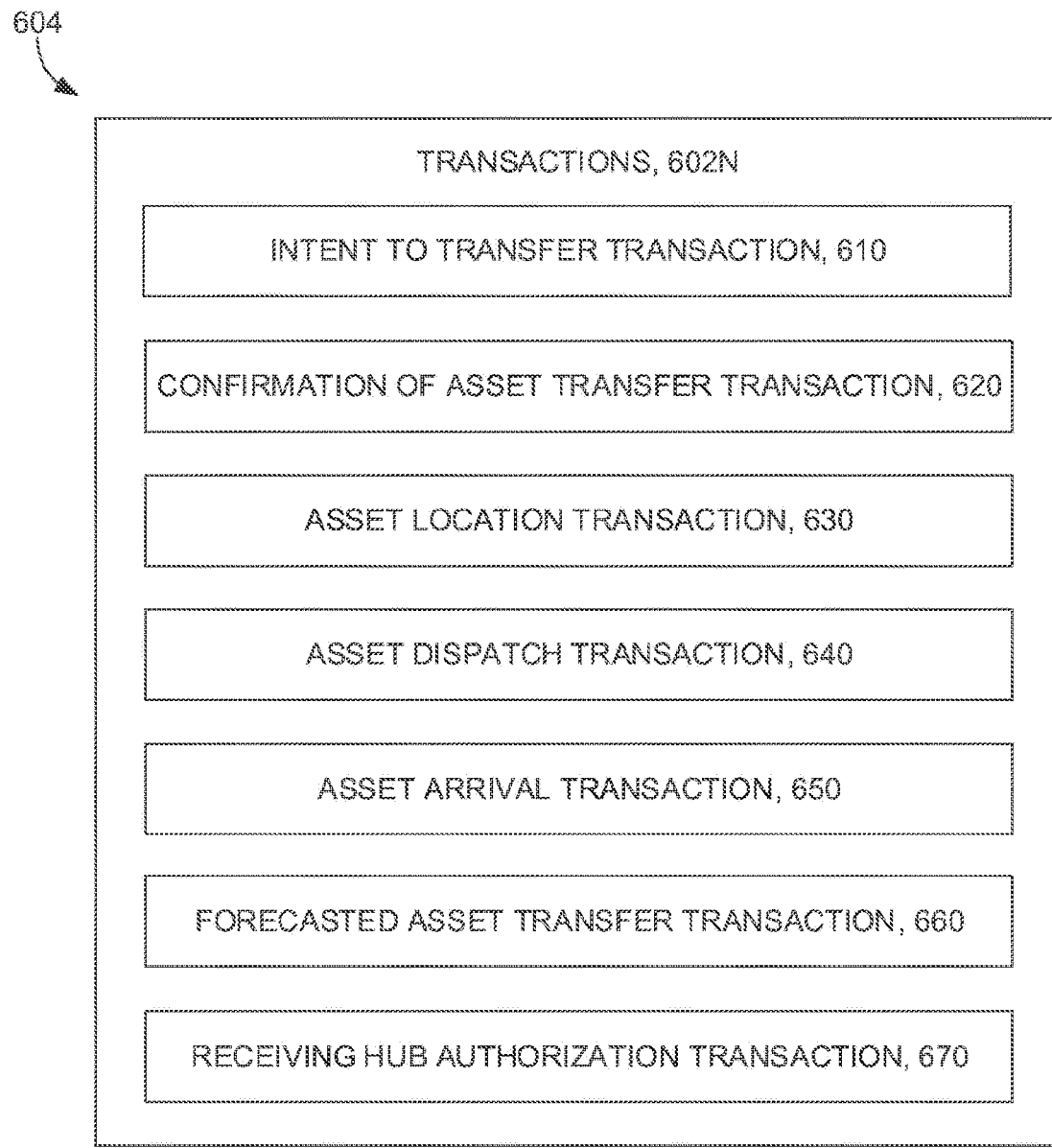

Turning now to FIGS. 6A-B, an exemplary schematic depiction of a distributed ledger network 600 comprising one or more transactions is depicted in accordance with some embodiments of the present disclosure. The distributed ledger network 600 can be maintained by a plurality of nodes 150A-150F, which may be the same system as illustrate by nodes 150n of FIG. 1. Nodes 150A-150F can be each in communication with each other over a network 612, which can be the same as network 120. In some embodiments, nodes 150A-150F can be in communication with the transportation hub server 110, scheduling server 140, asset location system 160, asset monitoring server 170, or any combination thereof.

As described herein, the distributed ledger network 600 can store one or more transactions 602N. At a high level, the transactions can be validated and committed for storage on the distributed ledger network 600 maintained by the one or more nodes 150A-150F. Any one of nodes 150A-150F can receive the transaction from one or more computing devices, such as the transportation hub server 110, the scheduling server 140, asset location system 160, asset monitoring server 170, node 150n, or any combination thereof. In some aspects, based on a node 150n validating the transaction, the node 150n can communicate the validated transaction to another node 150n. The transaction can then be stored on the distributed ledger. As illustrated in block diagram 604 of FIG. 6B, the one or more transactions 602N maintained by the plurality of nodes can include, among other transactions, an intent to transfer transaction 610, a confirmation of asset transfer transaction 620, an asset location transaction 630, an asset dispatch transaction 640, an asset arrival transaction 650, a forecasted asset transfer transaction 660, a receiving hub authorization transaction 670. It should be appreciated that any node 150A-150F can maintain a series of transaction, each transaction referencing different asset transfers. These asset transfers may be associated with the same or different assets. In other words, each transaction may relate to a different intent to transfer than the previous transaction.

The distributed ledger network 600 depicted in FIG. 6A includes a plurality of nodes 150A-150F, such as nodes 150n of FIG. 1, that are each in communication with one another over a network 612, which may be the same network as network 120 of FIG. 1. In accordance with the present disclosure, each node 150A-150F is a node described in accordance with FIG. 7, which is also a computing device later described in accordance with FIG. 11. In some embodiments, and preferably for public distributed ledger implementations, each node 150A-150F in the distributed ledger network 600 can operate as a peer to every other node 150A-150F of the distributed ledger network 600 such that no single node 150A-150F is more influential or powerful than any other node 150A-150F. Operations performed by nodes can include, among other things, validating transactions, verifying blocks of transactions, and adding records to an immutable database that is collectively maintained by the nodes 150A-150F. It is contemplated, however, that in some embodiments, a particular subset of the nodes 150A-150F can be specifically designated for performing a subset of or all node operations described herein. In this regard, as opposed to embodiments where each node is a peer with other nodes, some embodiments can employ specially-"designated nodes" (preferably for private distributed ledgers or ecosystems where centralization is not a concern) that perform a subset of or all of the described node operations.

In accordance with embodiments described herein, the immutable database collectively maintained by the nodes 150A-150F is referenced herein as a distributed ledger. The distributed ledger maintained by the distributed ledger network 600 includes a plurality of records that is immutable by virtue of the distributed nature of the distributed ledger network 600, applied cryptography concepts, and a consensus module that is independently included and operated by any number of nodes 150A-150F. While any node can generate a transaction to be added to the distributed ledger, the consensus module requires that the transaction be added to the distributed ledger only based on a determination that a consensus (e.g., greater than 50%) of the nodes 150A-150F (or designated nodes) has collectively validated the transaction. In this regard, while each node 150A-150F can independently store a copy of the distributed ledger, a record can only be added to the distributed ledger when a consensus to add the record has been reached by the nodes 150A-150F (or designated nodes) of the distributed ledger network 600.

In various embodiments, validation of a transaction is facilitated utilizing features of asymmetric key cryptography (i.e., public-private key pairs), among other things. In some aspects, as is commonly known in public distributed ledgers (e.g., Bitcoin), a private key can be employed to generate one or more associated public keys, encrypt data that can only be decrypted by an associated public key, or digitally sign data or transactions. On the other hand, a public key can be employed to decrypt data encrypted by an associated private key, encrypt data that only the private key can decrypt, or digitally authenticate a digital signature generated by an associated private key. As public keys can be shared freely, public keys generally function as "wallet addresses" that are associated with a private key. In this regard, electronic records, digital tokens or other units of value (e.g., Bitcoin) can be "transmitted" from one wallet address (i.e., a public key of a sender) to another wallet address (i.e., a public key of a receiver). In actuality, however, the transmission of an electronic record, a digital token, or unit of value is not a physical transfer, but is represented as a record of transfer from one wallet address to another that, if validated, is recorded onto the distributed ledger. The record is not finalized (i.e., added to the distributed ledger), however, until the transfer is validated by a consensus of the nodes 150A-150F in the distributed ledger network 600.

To generate a transaction to transfer an electronic record, a digital token(s), or unit of value, the system associated with the sending wallet address must digitally sign the transaction with the private key associated with the sending wallet address. Nodes 150A-150F (or designated nodes) of the distributed ledger network 600 must independently determine that the transaction from the sending wallet address is valid by digitally authenticating the digital signature with the sending wallet address (i.e., the public key). The nodes 150A-150F (or designated nodes) must also independently determine, by referencing their independently-stored copy of the distributed ledger, that the sending wallet address is in fact associated with a location corresponding to a location of the asset being transferred, or that the sending wallet address is associated with the asset being transferred (e.g., based on an indication from previous asset transfer records maintained on the distributed ledger). If a node (or designated node) in the distributed ledger network 600 determines that either of the foregoing conditions is not satisfied, the transaction is determined invalid by the node and the transaction is not passed on (e.g., communicated) to other nodes (or designated nodes) to which it is connected. On the other hand, if the node (or designated node) determines that both of the foregoing conditions are satisfied, the transaction is determined valid, and the node passes on (e.g., communicates) the transaction, along with an indication that the node independently validated the transaction, to other nodes 150A-150F (or designated nodes) to which it is connected. As the nodes 150A-150F in the distributed ledger network 600 are all directly or indirectly connected to one another, this validation process continues until the nodes (or designated nodes) collectively determine that a majority (i.e., consensus) has validated the transaction. The collective determination of consensus can be facilitated by virtue of each node (or designated node) maintaining a list of other nodes (or designated nodes) on the network (e.g., by IP address or other identifier) along with their respective determinations of transaction validity.

After a consensus of validity for a transaction has been reached by the nodes 150A-150F (or designated nodes), the transaction awaits confirmation (i.e., addition to the distributed ledger). As the nodes 150A-150F (or designated nodes) can be peers with each other, any node (or designated node) can participate in the process of adding the transaction to the distributed ledger. For purposes of background, the distributed ledger includes records of validated transactions that are grouped into a cryptographically chained series of blocks, whereby each block includes a subset of these records. Any node 150A-150F (or designated node) can perform the process of block generation, which can be implemented in a variety of ways based on a consensus algorithm implemented within its consensus module including, but not limited to, proof of work, proof of stake, proof of authority, practical Byzantine Fault Tolerance, or Federated Byzantine Agreements. As the aforementioned processes for block generation are generally known in the art, additional detail for these processes are not described herein. It is contemplated, however, that any implementation of block generation and consensus determination can be employed in accordance with the present disclosure. More importantly, as the general outcome of block generation is relatively similar among these implementations, the following description is provided irrespective of the block generation aspect of the consensus module.

To add a validated transaction to the distributed ledger network 600, the transaction must first be included into a block that is being generated by one of the nodes 150A-150F (or designated nodes) and subsequently validated by a consensus of the nodes (or designated nodes) in the distributed ledger network 600. The transaction can be independently included into a block, or grouped together with other transactions, either of which are included within the purview of the present disclosure. Such implementations may vary, however, based on consensus module design or a block size (i.e., memory limitation) implemented or defined within the consensus module operated by the nodes 150A-150F (or designated nodes). The node generating the block must also include, into the block it is generating, a cryptographic hash of the block most-recently added to the distributed ledger. Once generated in accordance with consensus rules defined within the consensus module, the node generating the block can send the generated block to the nodes (or designated nodes) to which it is connected.

The nodes (or designated nodes) receiving the generated block can then verify that the block includes one or more valid transactions, includes a hash value of the block most-recently added to the distributed ledger, and was generated in accordance with the defined consensus rules. Upon verifying the foregoing, the nodes (or designated nodes) can pass on (e.g., communicate) the verified block to its neighboring nodes (or neighboring designated nodes). In this way, similar to how a transaction is validated by a determined consensus of the distributed ledger network 600, the generated block including at least the transaction can be verified by another determined consensus of the nodes (or designated nodes). When a determination is made by a consensus of the nodes 150A-150F (or designated nodes) that a block is verified, the newly-verified block is added to the distributed ledger immediately subsequent to the previously-added block, the hash of the previously-added block being included in the newly-verified block. As such, each block is cryptographically "chained" to a previous block and a subsequent block. In other words, the cryptographic hashes facilitate maintenance of the order and accuracy of records included in the distributed ledger.

In some instances, if the same transaction is included into a block generated by different nodes (or designated nodes) and validated throughout the network within a substantially similar timeframe, the blocks can be temporarily confirmed leading up to a fork in the distributed ledger (e.g., two potential branches stemming from the main chain). The forked chain can be maintained by the nodes (or designated nodes) until a determination is made, by a consensus of the distributed ledger network 600, that one of the forks has a larger quantity of blocks than the other. Based on a subsequent determination that one of the forks is shorter than the other, the nodes (or designated nodes) can prune (e.g., delete) the shorter chain, and maintain the longer chain as the determinative distributed ledger.

In various embodiments, the distributed ledger is not necessarily limited to storing records relating to transfers of digital tokens or monetary value. In this regard, a record can include any type of electronic record, including but not limited to one or more transactions, smart contracts, electronic documents, images or other digital media, URIs, alphanumeric text, unique identifiers, IP addresses, timestamps, hashes of any of the foregoing, or references to any of the foregoing. Any of the foregoing examples can be viewed as being the subject of a transaction, or can be indirectly associated with a transaction. For instance, transactions stored in a medium other than the distributed ledger (e.g., a remote storage device, a cloud server, a database) can be referenced with a unique identifier. If the asset is a digital asset, a URI or hash of the digital asset can be the subject of the transaction. If the asset is a tangible asset, a unique identifier associated with the tangible asset can be the subject of the transaction. It is contemplated that any combination or alternative to the foregoing examples remains within the purview of the present disclosure.

With specific regard to smart contracts stored as records on the distributed ledger, a smart contract can include any algorithm that defines an action or event that is to be triggered based on a determination that one or more defined conditions precedent to the action or event have occurred. In various embodiments, a smart contract can be generated, transmitted, received, stored, validated, or verified by any node or computing device described in accordance with the present disclosure. It is further contemplated that a consensus module of each node or computing device in the distributed ledger network 600 is capable of interpreting and executing a Turing complete programming language, such as Solidity, by way of non-limiting example. It is further contemplated that in some embodiments, the distributed ledger itself is implemented based on the same programming language.

In various embodiments, smart contracts stored on the distributed ledger can be associated with a corresponding address, similar to that of a wallet address. The smart contract can be assigned a corresponding address by the distributed ledger network 600, or can be associated with a wallet address associated with one or more private keys. Counterparties associated with a smart contract can verify, via their respective computing devices in communication with one or more nodes of the distributed ledger network 600, that the smart contract has been immutably stored onto the distributed ledger based on a determined consensus of the nodes 150A-150F.

As smart contracts can be stored on the distributed ledger (e.g., as an intent to transfer transaction 610), each node (or designated node) can independently determine whether a smart contract's defined conditions precedent have occurred in order to verify that the terms of the smart contract have been met. In various embodiments, each node (or designated node) can determine the occurrence of defined conditions precedent based on electronic information communicated thereto or retrieved thereby. The electronic information can include, among other things, another transaction addressed to or referencing the smart contract, data from one or more computing devices remote from the distributed ledger network 600, data from a website, data from a database, published news events, published weather events, or any other type of electronic information that can be transmitted to or accessed by a node (or designated node) via a network.

Like other transactions, each node (or designated node) can communicate this verification to one or more neighboring nodes (e.g., other nodes in direct communication with the node or designated node) until a consensus of the nodes 150A-150F (or designated nodes) of the distributed ledger network 600 have collectively verified occurrence of the defined conditions precedent. Based on a determination that the defined conditions precedent has been verified by a consensus of the nodes 150A-150F, the smart contract can be committed to the distributed ledger. Additionally, once verified, or an event or action defined by the smart contract can be executed. In various embodiments, the event or action can include the processing of a transaction (e.g., generating a transaction for the confirmation of an asset transfer) that is not generated until a determination that the conditions precedent have occurred. Other actions or events can include a notification to one or more systems, releasing the asset associated with the asset transfer, instruct a resource (e.g., vehicle or operator resource) to proceed with the asset transfer, and the like. The smart contract may not be committed to the distributed ledger until all the conditions precedent have occurred. For example, based on determining that all conditions precedent have occurred, the node 150n can generate a transaction for the confirmation of the asset transfer. As described herein, systems of the operating environment 100 can query the distributed ledger to confirm that the asset transfer has been confirmed. In some embodiments, the node 150n may receive a smart contract from one or more systems within the operating environment 100. The node 105n can also receive information regarding the status of the conditions precedent. Based on validating that all the conditions precedent have been met, the smart contract can be verified by the node 105n. The transaction can then be communicated to other nodes in the network for verification. Once the transaction is verified by one or more nodes, the smart contract can be committed to the distributed ledger (e.g., as an intent to transfer transaction 610). Other systems within the operating environment can then query the distributed ledger to identify a transaction associated with the smart contract (e.g., an intent to transfer transaction 610) and determine that the asset transfer has been confirmed. In this regard, any asset transfer that is subject to the smart contract can remain unconfirmed until the conditions precedent have occurred. It should be appreciated that, in some instances, the smart contract can ensure that only accurate asset transfer data is committed the distributed ledger network 600. In some instances, this can contribute to enforcing data consistency between one or more systems.

As illustrated, a distributed ledger network 600 maintained by the one or more nodes 150A-150F may comprise one or more transactions 602N that can be used to verify asset transfers within the transportation network. While FIG. 6B depicts the transactions as separate transactions, the transactions may be combined in any manner to form one or more transactions. It should be appreciated that each of the one or more transactions 602N may include one or more references to another transaction via a transaction number, a digital address, or any other identifier that allows one or more systems to locate the transaction being referenced. By way of example, a confirmation of asset transfer transaction 620 may reference an intent to transfer transaction 610. As another example, the receiving hub authorization transaction 670 may reference the intent to transfer transaction 610. In this way, each of the transactions depicted in FIG. 6B can reference one another.

Additionally, each transaction 602N may include any data or information that is communicated or generated by the systems described herein. In some aspects, each transaction can include one or more asset parameters. As described, the asset parameters can include, but are not limited to, an asset identifier, a location associated with the asset or asset identifier (e.g., an asset location), a particular load being transported by the asset, an originating transportation hub (e.g., where the asset has or will be departing from), a destination transportation hub, a vehicle identifier (e.g., a ship, truck, airplane, or the like), a vehicle operator identifier, or any combination thereof.

Turning now to FIG. 6B, in various embodiments, the distributed ledger network 600 maintained by the one or more nodes 150A-150F can include one or more transactions 602N. In some embodiments, the one or more transactions 602N maintained by the one or more nodes 150A-150F can include an intent to transfer transaction 610. The intent to transfer transaction 610 relates to an expected transfer of an asset. For example, the intent to transfer transaction 610 can identify a physical asset that is (or will be) transferred between transportation hubs. The intent to transfer transaction 610 can include one or more asset transfer parameters associated with the asset transfer between transportation hubs. The intent to transfer transaction 610 can be generated by any system within the operating environment 100. Typically, the transportation hub server 110 associated with the dispatching hub generates the intent to transfer transaction. It should be appreciated that one or more systems within the operating environment 100 can monitor the distributed ledger network 600 to identify the intent to transfer transaction 610 and respond accordingly. For example, the one or more systems can confirm or deny the asset transfer. As a further example, the one or more systems can respond by communicating information related to the asset transfer parameters that may not be captured within the intent to transfer transaction 610, such as an asset location, whether the asset is forecasted, and the like. This information can be committed to the distributed ledger as a transaction that references the intent to transfer transaction 610. In yet a further example, the one or more systems can determine that the intent to transfer transaction 610 has been confirmed and coordinate the asset transfer accordingly.

As described herein, in some aspects, the intent to transfer transaction 610 can be associated with a smart contract. It should be appreciated that the smart contract can store the one or more definable fields including, among other things, an origination hub identification, a destination hub identification, an asset identifier, an asset location, an estimated departure, whether the asset transfer is a forecasted asset transfer, or any combination thereof.

A smart contract may require one or more conditions precedent. In aspects where the intent to transfer transaction 610 is associated with a smart contract, the intent to transfer transaction 610 can include at least one of the following conditions precedent: that the location of the asset be identified, that the asset transfer is identified as a forecasted asset transfer, that an authorization of the destination hub is identified, that all required asset transfer parameters be identified (e.g., the particular asset being transferred, a destination hub, an originating hub, date/time of expected asset transfer, or resources used for asset transfer) or any combination thereof. In some aspects, the conditions precedent require that the location of the asset be identified so that it can be determined whether the location of the asset corresponds to an originating hub location. In some embodiments, the conditions precedent can require a determination that the asset location corresponds to a particular locus of a particular transportation hub (e.g., an originating or destination hub). This can ensure that a single source of truth of the asset transfer in the digital realm is created based on the occurrence of the asset transfer within the physical word. This can be advantageous as it facilitates further automation of an asset transfer and maintains data accuracy across systems within the transportation network.

In some embodiments, the conditions precedent can require that the asset transfer correspond to a forecasted asset transfer. Identifying the asset transfer as a forecasted asset transfer can prevent inaccurate asset transfers from being introduced into the transportation network. In addition, this can ensure that no down-stream asset transfers are disrupted based on inaccurate asset transfer being executed. This can allow disparate systems within the transportation network can operate in unison.

In some embodiments, the conditions precedent can require that a destination hub has authorized the transaction. Determining that an a destination hub has confirmed the asset transfer can ensure that the destination hub can accommodate or receive the asset transfer.

In some embodiments, the conditions precedent can require that the state of the asset corresponds to an intent to transfer. The conditions precedent may require that the asset has a particular status around the date or time associated with the asset transfer. For example, the intent to transfer may be associated with an asset transfer at noon on October 25. The conditions precedent may require that the asset has a departed status or arrival status around that time to indicate that the circumstances surrounding the asset indicate that the intent to transfer is in process or completed. Similarly, the conditions precedent may require that the asset has a particular loading status. For instance, the conditions precedent may require that the asset is currently being loaded or has been loaded (e.g., loading status or loaded status). Additionally, the conditions precedent may require that the asset is currently being unloaded or has been unloaded (e.g., unloading status or loaded status). In this way, based on the particular state of the asset, the smart contract can be executed.

In various aspects, the conditions precedent can require one or more digital signatures of systems involved in the transportation network as a conditions precedent. For instance, as a conditions precedent, the smart contract may require the digital signatures from the scheduling server 140, the transportation hub server 110, the asset location system 160, the asset monitoring system 170, or the one or more nodes 150n. Utilizing the digital signatures from one or more systems in the transportation network as a conditions precedent can be a safeguard so that the information associated with asset transfer, as defined by the smart contract, is accurate. It should be appreciated that the digital signature of the one or more systems may be in lieu of or in addition to the conditions precedent discussed herein. In some embodiments, the digital signature is indicative of the individual systems determinations that relate to the conditions precedent. For instance, the digital signature of the asset location system 160 can indicate that the asset location system 160 has determined that the location of the asset corresponds to the location of the transportation hub. The digital signature of the scheduling server 140 can indicate that the asset transfer corresponds to a forecasted asset transfer as determined by the scheduling server 140. The digital signature of the asset monitoring component 170 can indicate that the asset transfer corresponds to a particular state of the asset (before, during, or after the physical transfer of the asset) as determined by the asset monitoring component 170.

Based on the conditions precedent, one or more nodes, such as nodes 150A-150F, can execute the smart contract. As described herein, the smart contract can be committed to the distributed ledger before or after the conditions precedent have occurred. For example, if the smart contract has been committed to the distributed ledger network 600 prior to the occurrence of the conditions precedent (e.g., as an intent to transfer transaction 610), the one or more nodes can generate a confirmation of the intent to transfer. The generated confirmation can then be communicated to the one or more systems of operating environment 100. Additionally, in some embodiments, the generated confirmation can be committed to the distributed ledger 600 that references the smart contract (e.g., the intent to transfer transaction 610). As a further example, the smart contract may not be committed to the distributed ledger until the occurrence of the conditions precedent. Based on determining that the conditions precedent have been met, the smart contract can be committed to the distributed ledger network 600.

In some embodiments, the one or more transactions 602N can include a confirmation of asset transfer transaction 620. The confirmation of asset transfer transaction 620 generally confirms the intent to transfer associated with the asset transfer. Additionally, the confirmation of asset transfer transaction 620 can capture the confirmation of each system based on its unique determinations. It should be appreciate that the confirmation of asset transfer transaction 620 can be generated by any system within the operating environment 100 to indicate its confirmation of the asset transfer. For example, the scheduling server 140 can generate the confirmation of asset transfer transaction 620 based on determining that the intent to transfer corresponds to a forecasted asset transfer. As a further example, the asset monitoring server 170 can generate the confirmation of asset transfer transaction 620 based on determining that the state of the asset corresponds (e.g., aligns with) the asset parameters associated with the asset transfer. It should be appreciated that the confirmation of asset transfer transaction 620 can reference any transaction 602N, including the intent to transfer transaction 610.

It should be appreciated that one or more systems within the operating environment 100 can facilitate the transfer of the asset in response to determining that the intent to transfer has been confirmed. In some aspects, the confirmation of asset transfer transaction 620 can identify one or more asset transfer parameters. Among other things, the confirmation of asset transfer transaction 620 can identify an asset identifier, an asset location, a forecasted asset transfer, a dispatching transportation hub, a destination transportation hub, a date or time of asset transfer, or a combination thereof. Additionally, as described above, the confirmation of asset transfer transaction 620 can be generated by one or more systems of the operating environment 100 based on determining that an intent to transfer transaction 610 has been confirmed. For example, if the intent to transfer transaction 610 is a smart contract that has been committed to the distributed ledger network 600, the one or more nodes 150A-150F can execute the smart contract and generate a confirmation of the asset transfer transaction 620. In various embodiments, the confirmation of asset transfer transaction 620 can reference one or more asset transfer parameters that are stored as transactions on the distributed ledger network 600, including an intent to transfer transaction 610, an asset location transaction 630, an asset location transaction 630, an asset dispatch transaction 640, an asset arrival transaction 650, a forecasted asset transfer transaction 660, or a receiving hub authorization transaction 670, or a combination thereof.

In various embodiments, the one or more transactions 602N maintained by the one or more nodes 150A-150F can include an asset location transaction 630. The asset location transaction can identify a location of the asset. The location of the asset can then be referenced by one or more nodes 150A-150F in validating an intent to transfer record. For example, the one or more nodes 150A-150F can determine whether the location of the asset, as identified by the asset location transaction 630, corresponds to a location of an originating or destination transportation hub.

In some embodiments, the one or more transactions 602N maintained by the one or more nodes 150A-150F can include an asset dispatch transaction 640. The asset dispatch transaction 640 generally records that an asset has been dispatched. In some aspects, the asset dispatch transaction 640 identifies that the asset has been dispatched from a dispatching transportation hub. Among other things, the asset dispatch transaction 640 can identify one of an asset identifier or an indication that the asset has been dispatched, or a combination thereof. One or more systems can then query the distributed ledger network 600 to determine whether the asset has been dispatched. In some aspects, the inbound asset component 530 can query the distributed ledger network 600 to determine whether the asset has been dispatched and communicate this information to a transportation hub server 110.

In various embodiments, the one or more transactions 602N maintained by the one or more nodes 150A-150F can include an asset arrival transaction 650. The asset arrival transaction 650 generally identifies that an asset has arrived at a destination hub location. Among other things, the asset arrival transaction 650 can identify one of an asset identifier or an indication that the asset has arrived at the destination transportation hub location, or a combination thereof. One or more systems can query the distributed ledger network 600 to determine whether the asset has arrived at a destination hub location.

In some embodiments, the one or more transactions 602N maintained by the one or more nodes 150A-150F can include a forecasted asset transfer transaction 660. The forecasted asset transaction 660 generally identifies that an asset transfer has been forecasted. In some embodiments, the asset arrival transaction 650 can identify one of an asset identifier, an indication that there is a forecasted asset transfer, one or more forecasted asset parameters, or a combination thereof. One or more systems can query the distributed ledger network 600 to determine whether the asset transfer has been forecasted.

In various embodiments, the one or more transactions 602N maintained by the one or more nodes 150A-150F can include a receiving hub authorization transaction 670. The receiving hub authorization transaction 670 generally identifies that an asset transfer has been approved by a destination transportation hub. Among other things, the receiving hub authorization transaction 670 may identify one of an asset identifier, an indication that the destination transportation hub has authorized the asset transfer, or a combination thereof. One or more systems can query the distributed ledger network 600 to determine whether the asset transfer has been authorized by the destination transportation hub.

As described herein, the asset transfer can be authorized by the transportation hub server associated with the destination transportation hub.

Figure 7:
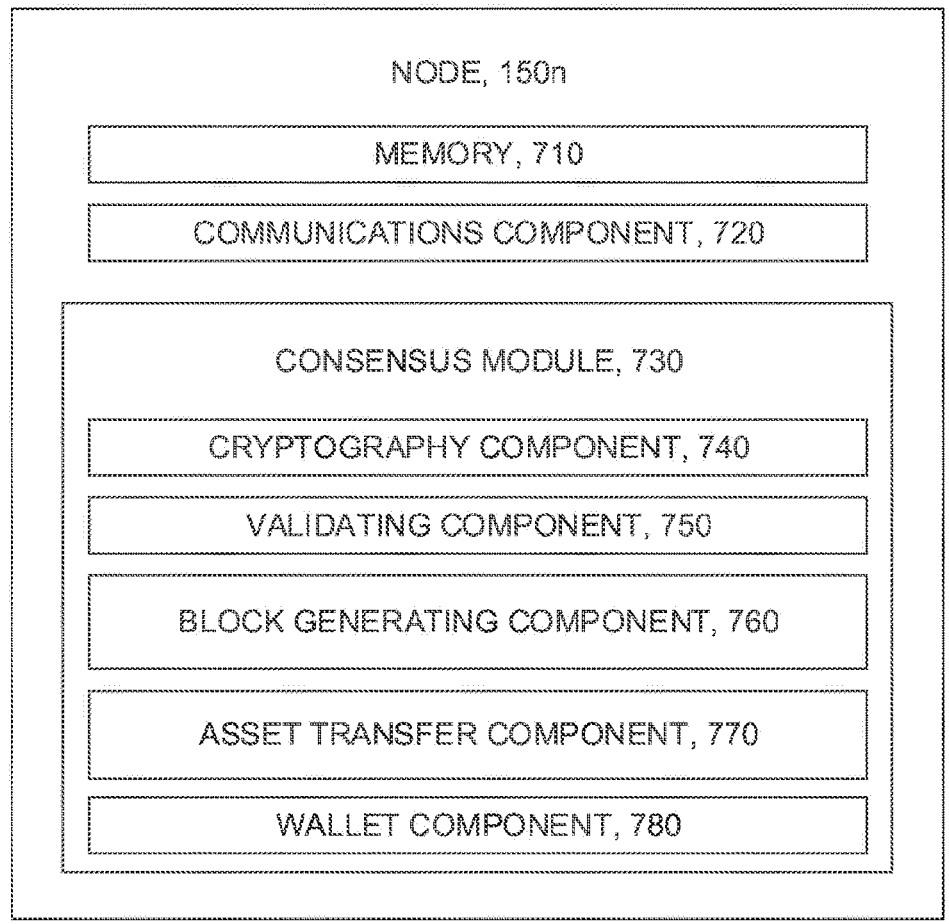
FIG. 7 is a block diagram depicting an exemplary node of a distributed ledger network in accordance with some embodiments of the present disclosure.

Turning now to FIG. 7, a block diagram 700 is provided depicting exemplary components of a node 150n (or designated node) in accordance with the present disclosure. The node 150n depicted in FIG. 7 can include, among other things, a memory 710, a communications component 720, and a consensus module 730. The memory 710 can include any type of memory, such as a hardware storage device, random access memory (RAM), a cache, read-only memory (ROM), and the like, including any combination thereof. The memory 710 can be employed to store executable computer code that, when executed by one or more processors of the node 150n, perform operations defined or implemented within the consensus module described herein. The memory 710 can also be employed to store data communicated from other nodes 150n, asset location systems 160, scheduling server 140, or transportation hub servers 110, such as those described in accordance with FIG. 1. The communicated data stored in memory can include, among other things, transactions, determinations of validity, determinations of authentication/verification, unique identifiers or IP addresses of one or more nodes 150n, and other types of electronic data not limited to the foregoing.

The communications component 720 can include any type of communications device that enables the node 150n to communicate with other nodes 150n, asset location systems 160, scheduling server 140, asset monitoring server 170, or transportation hub servers 110, such as those described in accordance with FIG. 1. Communications can be facilitated utilizing wired or wireless communications, and can employ any short or long-range communications technology including, but not limited to, LANs, WANs, Ethernet, the Internet, WiFi, Bluetooth, NFC, optics (e.g., QR codes, Infrared), Zigbee, radio, RFIDs, and the like.

The consensus module 730 can include any number of components or subcomponents that, together with the memory 710 and communications component 720, enable the node 150n to operate as a peer node (or a peer to other "designated" nodes) in a distributed ledger network, such as distributed ledger network 600 described in accordance with FIG. 6A. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, or software. For instance, various functions may be carried out by a processor executing instructions stored in memory.

In some embodiments, the consensus module 730 includes a cryptography component 740 that employs aspects of asymmetric cryptography (such as public-private key cryptography) to digitally authenticate transactions sent to the node or digitally sign transactions sent from the node. The cryptography component 740 may generate cryptographic hashes of data using a common-to-all-nodes hashing algorithm (e.g., SHA256, Scrypt, etc.). The cryptography component 740 can be used to encrypt and decrypt data. For example, the data may be encrypted and stored on the distributed ledger using the cryptography component 740 and/or decrypted from data stored on the distributed ledger using the cryptography component 740. In this respect, data encrypted with a private key (from a private-public key pair), may be decrypted using an associated public key. However, data encrypted with a public key (from a private-public key pair), may only be decrypted using the private key. It noted that this is an example, and an entirely different encryption/decryption scheme may be used for encrypting/decrypting data for storage on the distributed ledger.

The consensus module 730 can also include a validating component 750 for determining that a transaction communicated thereto is valid and authentic. In other words, the validating component 750 may validate transactions by digitally authenticating digital signatures of transactions with a public key (e.g., of a sending wallet address). In some embodiments, a transaction sent from an address of the sender (e.g., a scheduling server 140, a transportation hub server 110, an asset monitoring server 170, or an asset location system 160) can be authenticated by determining that the transaction is digitally signed with a private key associated with the sender's address.

In some embodiments, a consensus module 730 can also include a block generating component 760. The block generating component 760 can group validated transactions into a block of transactions, each of which is cryptographically linked to a previously-generated block of grouped and validated transactions. As the aforementioned processes for block generation are generally known in the art, additional detail for such processes are not described herein. It is contemplated, however, that any implementation of block generation and consensus determination can be employed in accordance with the present disclosure.

In some embodiments, consensus module 730 can include an asset transfer component 770. The asset transfer component 770 can execute functions or operations defined in a smart contract associated with an asset transfer between one or more transportation hubs. The asset transfer component 770 can communicate with the other components of the node to verify the preconditions of smart contract. For example, as described herein, a smart contract associated with the asset transfer can reference one or more asset transfer parameters, such as a location of the asset, a forecasted asset transfer (along with one or more forecasted asset transfer parameters), a dispatching hub, a destination hub, or an authorization of the destination hub, among other things, and execute the smart contract based on the occurrence of one or more condition precedents. As described herein, the one or more conditions precedent can include a determination that the smart contract references a digital signature of one or more systems within the operating environment 100. In some aspects, the one or more conditions precedent can require that the asset location corresponds to a particular locus of the originating hub location. In other words, the conditions precedent can require that the asset location is within a predefined threshold of an originating hub location. In various aspects, the conditions precedent can require that the asset transfer has been scheduled. Even more, in some aspects, the conditions precedent can require a particular state of the asset, such as dispatched or departure state or an arrival or received state. As each node 150n of a distributed ledger network includes common components and maintains a common copy of the distributed ledger, each node can commonly execute the functions or operations defined in the smart contract.

In various embodiments, each smart contract associated with asset transfer is associated with a smart contract address, which can be utilized as a receiving address for data relating to the asset transfer. A node 150*n* can receive data from one or more systems (such the systems described with reference to FIG. 1) that is addressed to a smart contract address. Employing asset transfer component 770, the node 150*n* can determine that the received data is addressed to the smart contract address, and that a set of compiled operations stored on the distributed ledger in association with the smart contract address is to be executed based on the received data or the set of compiled operations.

In some embodiments, the asset transfer component 770 can execute the operations defined by the smart contract based on received transaction that reference the smart contract. For instance, the asset transfer component 770 can determine whether a smart contract associated with an intent to transfer is received and identify the conditions precedent. The asset transfer component 770 can then reference the transactions received to determine whether the information contained therein or referenced by the transaction satisfy the conditions precedent. Based on determining the conditions precedent are satisfied, the asset transfer component 770 can verify or confirm the smart contract and communicate the confirmation of the intent to transfer to a neighboring node. As described herein, the intent to transfer can then be stored as a transaction on the distributed ledger network (e.g., an intent to transfer transaction).

For example, one or more transactions 602N of FIG. 6B may reference the smart contract. The smart contract can be defined to include a transportation hub's wallet address associated with the asset transfer. In some aspects, smart contract can be defined to include additional wallet addresses that are each associated with the scheduling server 140, the asset monitoring server 170, or the asset location system 160.

In various embodiments, to execute the smart contract, the asset transfer component 770 can determine whether one or more conditions precedent have occurred. As described herein, the smart contract can require one or more conditions precedent. The asset transfer component 770 can determine the occurrence of any of the condition precedents described herein. In general, the asset transfer component 770 can receive a smart contract (e.g., from one or more systems within the operating environment 100). The asset transfer component 770 can then extract the conditions precedents associated therewith. It should be appreciated that the asset transfer component 770 can access information required to satisfy the conditions precedent (e.g., an asset location, asset forecasts, a particular locus of a transportation hub).

As described herein, the conditions precedent may require a determination of whether a location of the asset has been identified, whether there is an indication that the asset transfer is a forecasted asset transfer, whether the state of the asset corresponds to the intent to transfer record, or whether a receiving hub location has authorized the asset transfer. Based on one or more of these, the asset transfer component 770 can confirm the asset transfer. In some aspects, based on determining the conditions precedent have occurred, the asset transfer component 770 can communicate its determination to other components of the node 150*n* so that the smart contract can be committed to the distributed ledger. In some aspects, if the smart contract has already been committed to the distributed ledger, the asset transfer component 770 can subsequently execute the smart contract based on the occurrence of the conditions precedent. In some aspects, the asset transfer component 770 generates a confirmation of the asset transfer for storage on a distributed ledger, such as a confirmation of asset transfer transaction 620.

In some embodiments, the asset transfer component 770 can determine whether the location of the asset corresponds to a location associated with the transportation hub location (e.g., an originating transportation hub or receiving transportation hub). For example, the asset transfer component 770 can determine whether the asset location is proximate to a dispatching location identified in the smart contract. In other words, the asset transfer component 770 may compare a known location (e.g., address, GPS coordinates, and the like) of the transportation hub (e.g., a transportation hub dispatching the asset or receiving the asset) with an asset location, which can also be identified in the smart contract. Based on this determination, the asset transfer component 770 can confirm the asset transfer based on determining the location of the asset corresponds to the location of transportation hub location. In some aspects, the asset transfer component 770 generates a confirmation of asset transfer transaction 620.

In various embodiments, the intent to transfer record may be associated with metadata that identifies a system that generated the intent to transfer record. For example, the metadata associated with the intent to transfer record can be a digital signature. In some embodiments, the one or more nodes 150*n* can analyze metadata associated with an intent to transfer record to determine whether a sender identifier is tied to a location that corresponds to the asset location. For example, one or more nodes 150*n* can determine whether the asset location is within a predetermined boundary of a transportation hub location. As a further example, the one or more nodes 150*n* can determine a location associated with a digital identifier generating the transaction from a data store. The one or more nodes 150*n* can then determine whether the location associated with the unique digital identifier is within a predetermined boundary of the dispatching hub. If the location corresponds to the asset location, the node 150*n* can confirm the intent to transfer record and commit it to storage onto a distributed ledger. In some instances, based on the node's 150*n* confirmation, the node 150*n* may store the intent to transfer record as a confirmation of asset transfer transaction 620.

In some embodiments, the unique digital identifier can be a digital signature. For example, a node 150*n* can receive an intent to transfer record that is digitally signed by the transportation hub server 110. The node 150*n* can then utilize the linking data store to determine a particular locus (e.g., a geo fence) associated with the digital signature. In some aspects, the particular locus defines a perimeter of a transportation hub. The node 150*n* can then determine whether the asset location corresponds to the location of the transportation hub by determining whether the asset location (e.g., GPS coordinates) is within the particular boundary of the transportation hub.

In various embodiments, the asset transfer component 770 can determine whether the scheduling server 140, the transportation hub server 110, or the asset location system 160 has digitally signed the smart contract. If so, the asset transfer component 770 can generate a confirmation of the asset transfer. In some aspects, the generated confirmation may be stored in the distributed ledger as a confirmation of asset transfer transaction 620.

In some embodiments, the consensus module 730 can include a wallet component 780. In some aspects, the wallet component 780 can securely store a private key for each of the one or more systems of a transportation network. Among other things, the wallet component 780 can query, from a locally-stored copy of the distributed ledger, one or more transactions associated with a public key associated with the stored private key, so that only those transactions that are addressed from or to the public key are provided to or caused for display on the system. In some aspects, the wallet component 780 can provide a list of relevant transactions. The wallet component 780 can receive inputs from a user or system to generate transactions, and can sign those transactions with the stored private key. It can also provide one or more systems with updates regarding a transaction status. The wallet component 780 can query the distributed ledger to identify transactions or records that reference the asset transfer. Accordingly, the wallet component 780 can be employed to detect when a transaction associated with an asset transfer identifies a public key of the transportation server 110, a public key of the scheduling server 140, a public key of the asset location system 160, a public key of the asset monitoring server 170, or any combination thereof.

Figure 8:
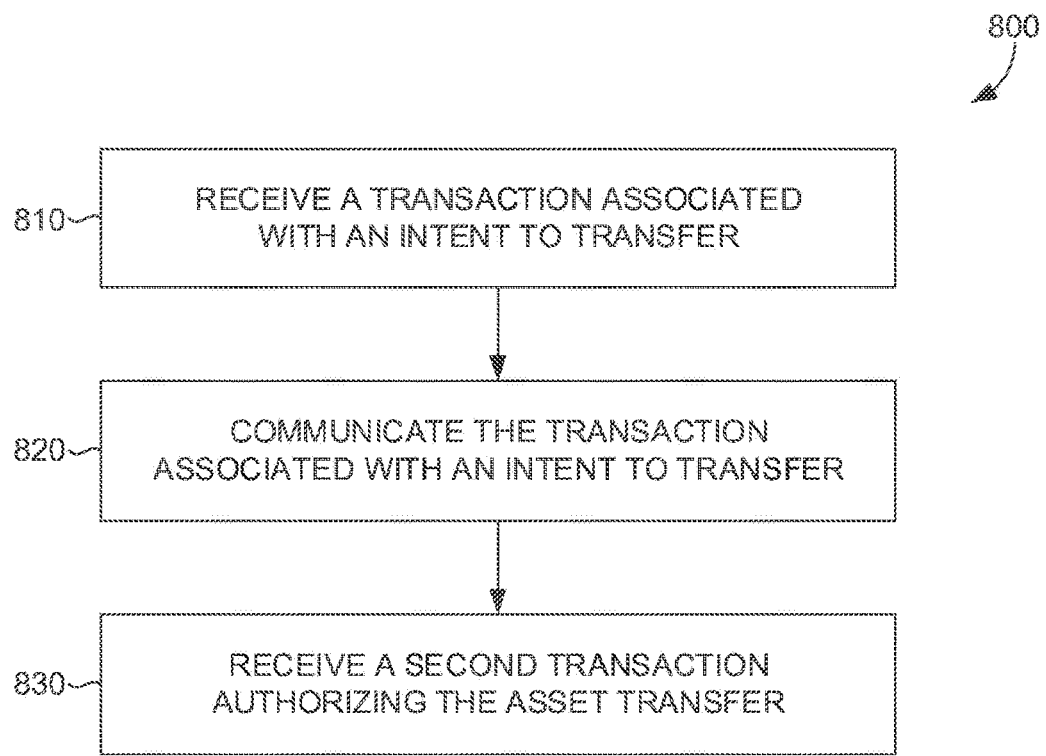
FIG. 8 is a flow diagram depicting an exemplary method for enforcing data consistency of a transportation network with verified transactions in accordance with some embodiments of the present invention.

Turning now to FIG. 8, a flow diagram 800 is provided that illustrates a method for enforcing data consistency of a transportation network with verified transactions. At step 810, a first transaction associated with an intent to transfer is received by a first node of a plurality of nodes. For example, the first transaction may be an intent to transfer transaction 610. The node can be associated with any system described in reference to FIG. 1. In some aspects, the node (e.g., transportation hub server 110) can be associated with the originating hub. It should be appreciated that, in some embodiments, the node can be a node in a distributed ledger network, such as node 150n. In some embodiments, the first transaction is generated based on receiving a first command indicating an intent to transfer an asset from the originating hub to a destination hub. In some aspects, the first command may be generated in response to user input received from a client device (e.g., computing device 1100 of FIG. 11).

In some embodiments, the first transaction can include one or more asset transfer parameters. For example, in some embodiments, the first transaction can include a sender identifier associated with the originating hub, a receiver identifier associated with the destination hub, an asset identifier associated with the asset, and a detected location of the asset. As described herein, the detected location may be obtained through an asset location system, such as the asset location system 160 of FIG. 1. In some embodiments, the location of the asset is detected by one or more sensors (e.g., sensor 420) located at the originating hub.

At step 820, the first transaction associated with the intent to transfer is communicated to any node of the plurality of nodes. In some aspects, the first transaction that was received can be communicated by a node (e.g., a transportation hub server 110) that is associated with an originating hub. In various embodiments, the plurality of nodes can be configured to obtain the communicated transaction and store it onto a distributed ledger based on a determined verification that the included detected location corresponds to a location associated with the included sender identifier. In some aspects, the verification is determined by the plurality of nodes. Additionally, the plurality of nodes can be configured to determine the verification based on a comparison of the detected location and the location associated with the sender identifier. For example, as described herein, the asset location system 160 or the node 150n can determine whether the location of the asset corresponds to the location associated with the sender (or receiver) identifier.

At step 830, a second transaction authorizing the asset transfer is received. In some embodiments, the second transaction references the first transaction and is received by the first node. In some embodiments, the second transaction can be associated with a confirmation by the one or more systems within the operating environment 100. In some embodiments, the second transaction can be associated with an intent to receive the asset from the originating hub. For example, the second transaction may be a receiving hub authorization transaction 670. The second transaction can be generated by a second node of the plurality of nodes. By way of example, the second node can be associated with the any systems of the operating environment 100, such as destination transportation hub (e.g., a transportation hub server 110). In some aspects, the second node can be configured to generate the second transaction based on a determination that the communicated first transaction was stored onto the distributed ledger. Additionally, the second node can be configured to generate the second transaction based on receiving a second command indicating an intent to receive the asset from the originating hub. For example, the second command can be received from a second client device (e.g., a computing device 1100) associated with the destination hub. In some aspects, the second client device can be configured to communicate the second command to the second node in response to a received input. In some embodiments, the second transaction can be generated and capture the one or more determinations by the components of the systems of the operating environment 100 described herein.

In various embodiments, the second node is configured to determine that the first transaction is stored on the distributed ledger. For example, the node may query the distributed ledger for the first transaction. In some aspects, the node can utilize an identifier (e.g., a sender identifier, a receiver identifier, or an asset identifier) to query the distributed ledger for the first transaction and determine if it is stored on the distributed ledger. By way of example, if the node is associated with a transportation server 110, the node can utilize an asset transfer component 230 or a wallet component 780, or a combination thereof to query the distributed ledger. A client device, such as computing device 1100, associated with the originating hub can be configured to display the first transaction based on the determination that the first transaction is stored on the distributed ledger. While not illustrated, the second transaction can be stored on the distributed ledger. In various embodiments, the second node can commit the second transaction for storage on the distributed ledger to confirm that the destination hub can receive the asset.

Figure 9:
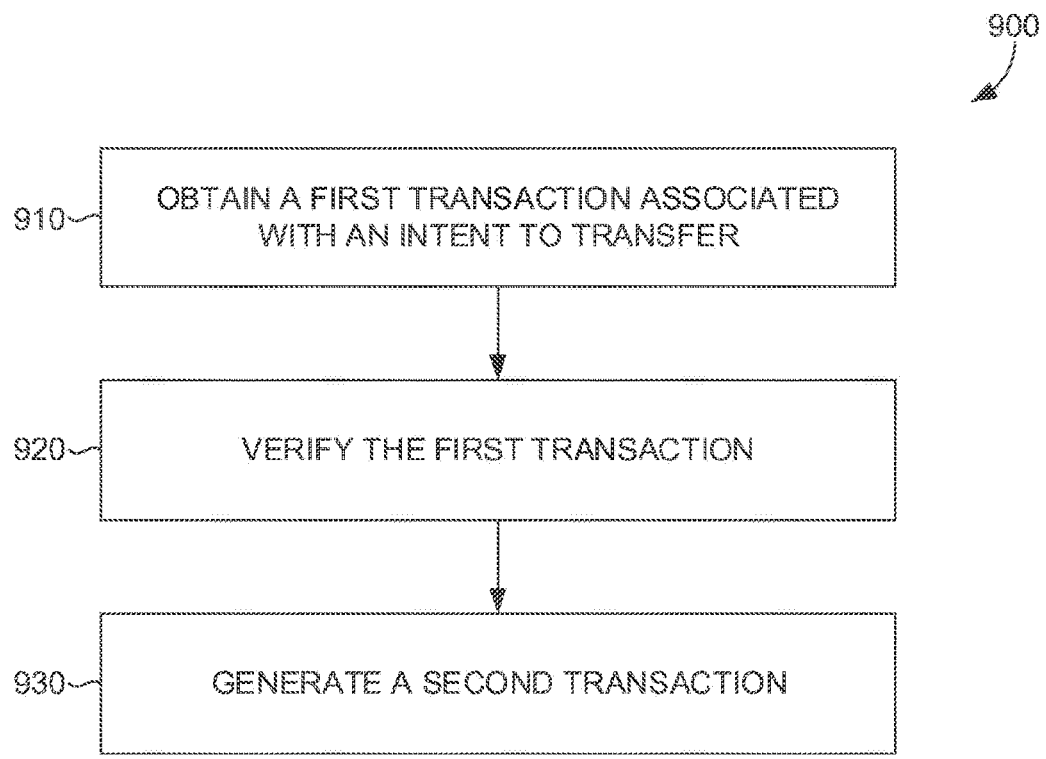
FIG. 9 is a flow diagram depicting an exemplary method for enforcing data consistency of a transportation network with verified transactions in accordance with some embodiments of the present invention.

Turning now to FIG. 9, a flow diagram 900 is provided that illustrates a method for enforcing data consistency of a transportation network with verified transactions. At step 910, a first transaction associated with an intent to transfer an asset is obtained. In some aspects, the first transaction can be obtained based on receiving a communication from one or more systems (also referred to as a node) within the operating environment 100. For example, a node (e.g., a transportation hub server 110) associated with a transportation hub may communicate the first transaction to another node within the operating environment 100.

In various embodiments, the first transaction can be generated by a second node of the plurality of nodes. The second node (e.g., a transportation hub server 110) can be associated with an originating hub. In some aspects, the second node can be configured to generate the first transaction based on receiving a first command indicating an intent to transfer an asset from the originating hub to the destination hub. The first command can be received via a client device, such as computing device 1100 that is described in reference to FIG. 11. The generated first transaction can include, among other things, a sender identifier associated with the originating hub, an asset identifier associated with the asset, and a detected location of the asset.

In various embodiments, the detected location is obtained by a sensor module. For example, the location can be detected by the sensor 420 associated with the asset location system 160 of FIG. 4. The sensor module may include, among other things, one of a GPS module, a camera, a proximity sensor, a wireless beacon, or a wireless access point. In some embodiments, the location of the asset is detected by one or more sensors located at the originating hub. It should be appreciated that while not necessary, at least one sensor module can be coupled to the asset, as described herein.

At step 920, the first transaction is verified by one or more nodes. In various embodiments, the first node can determine that the first transaction is verified based on one or more asset transfer parameters. By way of example, the first node can determine that the detected location included in the first transaction corresponds to a location associated with the included sender identifier. Additionally, the verification can include a determination that the intent to transfer corresponds to a forecasted asset transfer. As a further example, verification can include a determination that the state of the asset corresponds with the intent to transfer. In some aspects, the plurality of nodes are configured to collectively determine the verification. In some embodiments, if the first transaction is associated with a smart contract, the first transaction can be verified based one or more conditions precedent as described herein. For instance, the conditions precedent can require the digital signature of one or more nodes within the operating environment 100.

At step 930, a second transaction is generated by the one or more nodes. In various embodiments, the second transaction can be generated by the first node based on the storage of the obtained first transaction. In addition, the second transaction may comprise one or more digital signatures confirming the first transaction. In some aspects, the second transaction can be the transactions 602N of FIG. 6B. For instance, the second transaction is associated with an authorization to receive the transfer, such as the receiving hub authorization transaction 670 of FIG. 6B. In various aspects, the plurality of nodes can be configured to store the generated second transaction onto the distributed ledger. In some embodiments, the second transaction can be associated with a smart contract that is committed to the distributed ledger based on the occurrence of one or more conditions precedents, as described herein. It should be appreciated that the second transaction may refer to a different asset transfer. For example, the second transaction can be associated with a second transfer of intent that is cryptographically linked to the first transaction.

Figure 10:
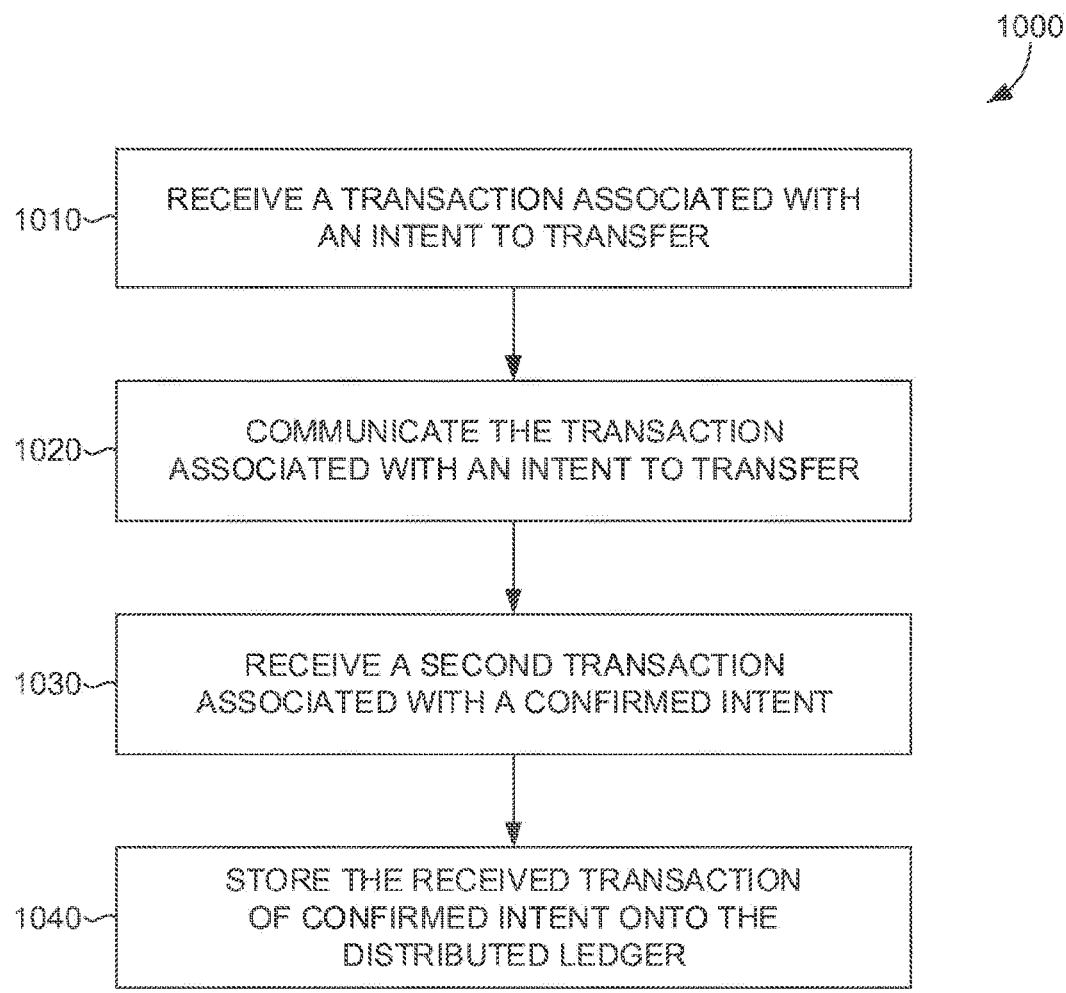
FIG. 10 is a flow diagram depicting an exemplary method for enforcing data consistency of a transportation network with verified transactions in accordance with some embodiments of the present invention.

Turning now to FIG. 10, a flow diagram 1000 is provided that illustrates a method for enforcing data consistency of a transportation network with verified transactions. At step 1010, a first transaction associated with an intent to transfer is received by a first node of a plurality of nodes. The node can be any system of operating environment described in reference to FIG. 1. In some embodiments, the node is a node 150A maintaining a distributed ledger. In some embodiments, the first transaction is generated based on receiving a first command indicating an intent to transfer an asset from the originating hub to a destination hub. In some aspects, the first command may be generated in response to user input received from a client device (e.g., computing device 1100 of FIG. 11). In addition, the first command may be issued in response to one or more determinations described herein. For example, the first command may be generated in response a determination regarding the state of the asset (e.g., a departure or arrival of the asset). As another example, the first command may be generated in response to a determination regarding whether the asset transfer is a forecasted asset transfer.

The first transaction can include one or more asset transfer parameters. For example, in some embodiments, the first transaction can include a sender identifier associated with the originating hub, an asset identifier associated with the asset, and a detected location of the asset. As described herein, the detected location can be obtained through an asset location system, such as the asset location system 160 of FIG. 1. In some embodiments, the location of the asset is detected by one or more sensors (e.g., sensor 420) coupled to the asset. Additionally, the location of the asset is detected by one or more sensors (e.g., sensor 420) associated with the originating hub. Additionally, in some embodiments, the first transaction is associated with a smart contract. As such, the first transaction may comprise one or more conditions precedent, as described herein.

At step 1020, the first transaction associated with the intent to transfer is communicated. The first transaction can be communicate to any node of the operating environment 100. In some aspects, the first transaction can be communicated by a node 150A maintaining a distributed ledger to another node 150B maintaining a distributed ledger. In various embodiments, the plurality of nodes 150A-F can be configured to obtain the communicated transaction and store it onto a distributed ledger based on a determined verification that the included detected location corresponds to a location associated with the included sender identifier. As described herein, the plurality of nodes can be configured to determine the verification based on a comparison of the detected location and the location associated with the sender identifier. In some aspects, the determined verification includes determining the occurrence of one or more conditions precedent of smart contract. For instance, the conditions precedent may require a digital signature associated with a transportation hub server 110, a scheduling server 140, an asset location system 160, or an asset monitoring system 170. In some aspects, the verification is determined by the plurality of nodes.

At step 1030, a transaction associated with a confirmed intent is received. In some embodiments, the second transaction references the first transaction and is received by the first node. In some embodiments, the second transaction can be associated with a confirmation by one or more nodes of the operating environment 100. For example, the second transaction may be a command to digitally sign a smart contract associated with intent to transfer.

The second transaction can be generated by a second node of the plurality of nodes. By way of example, the second node may be a transportation hub server 110, a scheduling server 140, an asset location system 160, or an asset monitoring system 170. As described herein, the first transaction can be associated with a smart contract that will be committed to the distributed to the ledger based on the occurrence of one or more conditions precedent. The second node can be configured to generate the second transaction based on one or more determinations regarding whether the intent to transfer should be confirmed. As described herein, the intent to transfer can be confirmed based on the asset transfer corresponding to a forecasted asset transfer, corresponding to a particular asset state, or based on being authorized by one or more transportation hubs.

At step 1040, the received transaction of confirmed intent can be stored onto the distributed ledger. In various embodiments, the second node can commit the second transaction for storage on the distributed ledger to confirm the intent to transfer. In some embodiments, the stored transaction of confirmed intent can reference an intent to receive transaction. In various embodiments, a node can query the distributed ledger to determine whether the intent to transfer has been confirmed.

While not shown, the exemplary flow diagram 1000 may comprise storing the transaction associated with the intent to transfer onto the distributed ledger (e.g., as an intent to transfer transaction 610). This may be in lieu of or in addition to the illustrated steps. For example, as described herein the intent to transfer may be associated with a smart contract. The node (e.g., 150n) may receive transactions from one or more nodes of the operating environment 100 to determine that all conditions precedents have occurred. Based on the occurrence of one or more conditions precedent, the node (e.g., node 150N) can commit the intent to transfer transaction onto the distributed ledger.

With reference to FIG. 11, computing device 1100 includes a bus 1110 that directly or indirectly couples the following devices: memory 1112, one or more processors 1114, one or more presentation components 1116, input/output (I/O) ports 1118, input/output components 1120, and an illustrative power supply 1122. Bus 1110 represents what can be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, and removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise transitory signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer-storage media in the form of volatile memory, nonvolatile memory, or a combination thereof. The memory can be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components 1116 include a display device, speaker, printing component, vibrating component, etc.

I/O ports 1118 allow computing device 1100 to be logically coupled to other devices including I/O components 1120, some of which can be built in. Illustrative components include a microphone, joystick, game pad, satellite dish, scanner, printer, wireless device, etc. The I/O components 1120 can provide a natural user interface (NUI) that processes air gestures, voice, or other physiological inputs generated by a user. In some instances, inputs can be transmitted to an appropriate network element for further processing. An NUI can implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 can be equipped with depth cameras, such as stereoscopic camera systems, infrared camera systems, RGB camera systems, touchscreen technology, and combinations of these, for gesture detection and recognition. Additionally, the computing device 1100 can be equipped with accelerometers or gyroscopes that enable detection of motion. The output of the accelerometers or gyroscopes can be provided to the display of the computing device 1100 to render immersive augmented reality or virtual reality.

As can be understood, embodiments of the present invention provide for, among other things, enforcing consistency of data between disparate systems of a transportation network with verified transactions. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

What is claimed is:

1. A method comprising:
receiving, by a first node of a plurality of nodes and from a first computing device associated with an originating hub in a transportation network, a first transaction involving an intent to transfer an asset from the originating hub to a destination hub in the transportation network, wherein the first transaction is generated based on a first command indicating the intent to transfer the asset from the originating hub to the destination hub, and the first transaction comprises a detected location of the asset;
determining, by the first node, a verification that the detected location corresponds to the originating hub;
storing, by the first node and based at least in part on determining the verification, the first transaction onto a distributed ledger managed by the plurality of nodes;
receiving, by a second node of the plurality of nodes from a second computing device associated with the destination hub, a second transaction authorizing transfer of the asset to the destination hub, wherein the second transaction is generated based at least in part on a determination that the first transaction is stored onto the distributed ledger, and the second transaction references the first transaction; and
storing, by the second node and based at least in part on the second transaction referencing the first transaction, the second transaction onto the distributed ledger.

2. The method of claim 1, further comprising:
authenticating, by the first node, that the first transaction is digitally signed with a first private key associated with the originating hub; and
authenticating, by the second node, that the second transaction is digitally signed with a second private key associated with the destination hub, wherein storing the first transaction is based at least in part on authenticating that the first transaction is digitally signed with the first private key and storing the second transaction is based at least in part on authenticating that the second transaction is digitally signed with the second private key.

3. The method of claim 1, wherein the first transaction comprises a sender identifier, and determining the verification that the detected location corresponds to the originating hub comprises:
identifying, based at least in part on the sender identifier, a location associated with the originating hub; and
determining the detected location satisfies a predefined threshold with respect to the location associated with the originating hub.

4. The method of claim 1, wherein the first transaction comprises a sender identifier, and the method further comprises identifying, by the first node and based at least in part on the sender identifier, a smart contract that defines the verification is a condition for storing the first transaction on the distributed ledger.

5. The method of claim 4, wherein the plurality of nodes maintains the smart contract on the distributed ledger.

6. The method of claim 1, wherein the verification also comprises determining that a state of the asset corresponds with the intent to transfer the asset from the originating hub to the destination hub.

7. The method of claim 1, wherein the determination that the first transaction is stored onto the distributed ledger is performed by the second computing device.

8. A system comprising a plurality of nodes that manage a distributed ledger, wherein:
a first node of the plurality of nodes is configured to:
receive, from a first computing device associated with an originating hub in a transportation network, a first transaction involving an intent to transfer an asset from the originating hub to a destination hub in the transportation network, wherein the first transaction comprises a detected location of the asset;
determine a verification that the detected location corresponds to the originating hub;
store, based at least in part on determining the verification, the first transaction onto the distributed ledger; and
a second node of the plurality of nodes is configured to:
receive, from a second computing device associated with the destination hub, a second transaction authorizing transfer of the asset to the destination hub, wherein the second transaction references the first transaction; and
store, based at least in part on the second transaction referencing the first transaction, the second transaction onto the distributed ledger.

9. The system of claim 8, wherein the first node is further configured to authenticate that the first transaction is digitally signed with a first private key associated with the originating hub, and storing the first transaction is based at least in part on authenticating that the first transaction is digitally signed with the first private key.

10. The system of claim 8, wherein the first transaction comprises a sender identifier, and the first node is configured to determine the verification that the detected location corresponds to the originating hub by:
identifying, based at least in part on the sender identifier, a location associated with the originating hub; and
determining the detected location satisfies a predefined threshold with respect to the location associated with the originating hub.

11. The system of claim 8, wherein the first node is further configured to identify a smart contract that defines the verification is a condition for storing the first transaction on the distributed ledger.

12. The system of claim 8, wherein the first node is configured to perform the verification by also determining that a state of the asset corresponds with the intent to transfer the asset from the originating hub to the destination hub.

13. A method comprising:
receiving, by a first node of a plurality of nodes and from a first computing device associated with an originating hub in a transportation network, a first transaction involving an intent to transfer an asset from the originating hub to a destination hub in the transportation network, wherein the first transaction is generated based on a first command indicating the intent to transfer the asset from the originating hub to the destination hub, and the first transaction comprises an asset identifier;
obtaining, by the first node and based at least in part on the asset identifier, a detected location of the asset;

determining, by the first node, a verification that the detected location corresponds to the originating hub; and storing, by the first node and based at least in part on determining the verification, the first transaction onto a distributed ledger managed by the plurality of nodes.

14. The method of claim 13 further comprising:

receiving, by a second node of the plurality of nodes from a second computing device associated with the destination hub, a second transaction authorizing transfer of the asset to the destination hub, wherein the second transaction is generated based at least in part on a determination that the first transaction is stored onto the distributed ledger, and the second transaction references the first transaction; and storing, by the second node and based at least in part on the second transaction referencing the first transaction, the second transaction onto the distributed ledger.

15. The method of claim 14, wherein the determination that the first transaction is stored onto the distributed ledger is performed by the second computing device.

16. The method of claim 13, further comprising:

authenticating, by the first node, that the first transaction is digitally signed with a first private key associated with the originating hub, wherein storing the first transaction is based at least in part on authenticating that the first transaction is digitally signed with the first private key.

17. The method of claim 13, wherein the first transaction comprises a sender identifier, and determining the verification that the detected location corresponds to the originating hub comprises:

identifying, based at least in part on the sender identifier, a location associated with the originating hub; and determining the detected location satisfies a predefined threshold with respect to the location associated with the originating hub.

18. The method of claim 13, wherein the first transaction comprises a sender identifier, and the method further comprises identifying, by the first node and based at least in part on the sender identifier, a smart contract that defines the verification is a condition for storing the first transaction on the distributed ledger.

19. The method of claim 18, wherein the plurality of nodes maintains the smart contract on the distributed ledger.

20. The method of claim 13, wherein the verification also comprises determining that a state of the asset corresponds with the intent to transfer the asset from the originating hub to the destination hub.

* * * * *